United States Patent
Chen et al.

(10) Patent No.: US 9,930,539 B2
(45) Date of Patent: Mar. 27, 2018

(54) PHYSICAL BROADCAST CHANNEL FOR COVERAGE ENHANCEMENT

(71) Applicant: QUALCOMM Incorporated, San Diego, CA (US)

(72) Inventors: Wanshi Chen, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 14/934,733

(22) Filed: Nov. 6, 2015

(65) Prior Publication Data

US 2016/0135058 A1    May 12, 2016

Related U.S. Application Data

(60) Provisional application No. 62/078,308, filed on Nov. 11, 2014.

(51) Int. Cl.
| | |
|---|---|
| *H04W 16/26* | (2009.01) |
| *H04L 5/00* | (2006.01) |
| *H04W 72/00* | (2009.01) |

(52) U.S. Cl.
CPC .......... *H04W 16/26* (2013.01); *H04L 5/0053* (2013.01); *H04W 72/00* (2013.01); *H04L 5/0007* (2013.01); *H04L 5/0069* (2013.01)

(58) Field of Classification Search
CPC .... H04W 16/26; H04W 72/00; H04L 5/0053; H04L 5/0007
USPC ........................................................ 370/329
See application file for complete search history.

(56) References Cited

U.S. PATENT DOCUMENTS

| | | | | |
|---|---|---|---|---|
| 2011/0039499 A1* | 2/2011 | Zhang | ................ | H04W 74/008 455/67.11 |
| 2015/0296518 A1* | 10/2015 | Yi | ............................ | H04L 1/08 370/336 |

FOREIGN PATENT DOCUMENTS

WO    WO-2014069945 A1    5/2014

OTHER PUBLICATIONS

Catt, "PBCH Coverage Improvement for Low-cost MTC UEs," 3GPP TSG RAN WG1 Meeting #72bis, R1-130982, Chicago USA, Apr. 15-19, 2013, 4 pgs., XP_50696975A, 3rd Generation Partnership Project.

(Continued)

*Primary Examiner* — Sai Ming Chan
(74) *Attorney, Agent, or Firm* — Holland & Hart LLP

(57) ABSTRACT

Methods, systems, and devices for wireless communication are described. A base station may select a repetition level for a physical broadcast channel (PBCH) based on system configuration parameters. A user equipment (UE) may identify the system configuration. For example, the UE may assume a system bandwidth, assume a control region size, and determine whether the cell is a time division duplexing (TDD) or frequency division duplexing (FDD) cell. The UE may then determine a PBCH configuration based on the system configuration. For example, the PBCH repetition level may depend on the system configuration, such as whether a TDD or FDD scheme is employed. The UE may then receive a PBCH transmission according to the PBCH configuration. If a different cell has a different system configuration, the UE may determine a different PBCH configuration and receive PBCH using a different repetition level and different resources.

30 Claims, 19 Drawing Sheets

(56) References Cited

OTHER PUBLICATIONS

Catt, "Further Discussion on PBCH Coverage Improvement for MTC UEs," 3GPP TSG RAN WG1 Meeting #76, R1-140074, Prague Czech Republic, Feb. 10-14, 2014, 6 pgs., XP_50751571A, 3rd Generation Partnership Project.
ISA/EPO, International Search Report and Written Opinion of the International Searching Authority, Int'l App. No. PCT/US2015/059757, dated Feb. 16, 2016, European Patent Office, Rijswijk, NL, 13 pgs.

* cited by examiner

PHYSICAL BROADCAST CHANNEL FOR COVERAGE ENHANCEMENT

CROSS REFERENCES

The present Application for Patent claims priority to U.S. Provisional Patent Application No. 62/078,308 by Chen et al., entitled "PBCH For Coverage Enhancement," filed Nov. 11, 2014, assigned to the assignee hereof and expressly incorporated by reference herein.

BACKGROUND

Field of Disclosure

The following relates generally to wireless communication and more specifically to physical broadcast channel (PBCH) for coverage enhancement.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

In some cases, a base station may utilize coverage enhancement techniques to improve the quality of communications with UEs. For example, some UEs, such as machine type communication (MTC) devices, may be low complexity, low cost, or autonomously functioning devices with limited radio capabilities. Transmitting system information to these devices using the same repetition level used for other UEs may result in lost packets or service disruption.

SUMMARY

Systems, methods, and apparatuses for physical broadcast channel (PBCH) coverage enhancement are described. A base station may select a repetition level for PBCH based on system configuration parameters. A user equipment (UE) may identify a system configuration. For example, the UE may assume a system bandwidth, assume a control region size, or determine whether the cell is a time division duplexing (TDD) or frequency division duplexing (FDD) cell. The UE may then determine a PBCH configuration based on the system configuration, such as whether the system is configured for TDD or FDD operation. The PBCH repetition level may depend on whether the system configuration is TDD or FDD. The UE may receive a PBCH transmission according to the PBCH configuration. If a different cell has a different system configuration, the UE may determine a different PBCH configuration and receive PBCH using a different repetition level and different resources.

A method of wireless communication at a UE is described. The method may include identifying a system configuration of a cell, determining a PBCH configuration based at least in part on the system configuration, and receiving a PBCH transmission according to the PBCH configuration.

An apparatus for wireless communication at a UE is described. The apparatus may include means for identifying a system configuration of a cell, means for determining a PBCH configuration based at least in part on the system configuration, and means for receiving a PBCH transmission according to the PBCH configuration.

A further apparatus for wireless communication at a UE is described. The apparatus may include a processor, memory in electronic communication with the processor, and instructions stored in the memory. The instructions may be executable by the processor to cause the apparatus to identify a system configuration of a cell, determine a PBCH configuration based at least in part on the system configuration, and receive a PBCH transmission according to the PBCH configuration.

A non-transitory computer-readable medium storing code for wireless communication at a UE is described. The code may include instructions executable to identify a system configuration of a cell, determine a PBCH configuration based at least in part on the system configuration, and receive a PBCH transmission according to the PBCH configuration.

In some examples of the method, apparatuses, or non-transitory computer-readable medium described herein, determining the PBCH configuration includes determining an amount of PBCH repetition based at least in part on the identified system configuration. In some examples of the method, apparatuses, or non-transitory computer-readable medium described herein, identifying the system configuration includes identifying whether a TDD or an FDD scheme is being used by the system, and the PBCH configuration is determined based at least in part on whether the TDD or the FDD scheme is being used by the system. Additionally or alternatively, some examples may include features, means, or instructions for determining a first PBCH repetition amount for the FDD scheme, and determining a second PBCH repetition amount for the TDD scheme, where the second PBCH repetition amount is larger than the first PBCH repetition amount.

In some examples of the method, apparatuses, or non-transitory computer-readable medium described above, identifying the system configuration includes identifying a carrier type for the system, and the PBCH configuration is determined based at least in part on the identified carrier type. Additionally or alternatively, in some examples identifying the system configuration includes identifying a cyclic prefix (CP) type for the system, and the PBCH configuration is determined based at least in part on the identified CP type.

In some examples of the method, apparatuses, or non-transitory computer-readable medium described above, identifying the system configuration includes assuming a system bandwidth, and the PBCH configuration is determined based at least in part on the assumed system bandwidth. Additionally or alternatively, some examples may include features, means, or instructions for determining a number of symbols for a control region corresponding to the assumed system bandwidth, wherein the PBCH configuration is based at least in part on the number of symbols for the control region.

In some examples of the method, apparatuses, or non-transitory computer-readable medium described above, the assumed system bandwidth is larger than ten (10) resource blocks, and determining the PBCH configuration based at least in part on three (3) symbols for a control region. Additionally or alternatively, in some examples, the assumed system bandwidth is no more than ten (10) resource blocks, and determining the PBCH configuration based at least in part on four (4) symbols for a control region.

In some examples of the method, apparatuses, or non-transitory computer-readable medium described above, receiving the PBCH transmission comprises performing PBCH detection based on an assumed size of a control region, irrespective of a system bandwidth. Additionally or alternatively, in some examples the assumed size of the control region is three (3) symbols. In some examples, the assumed size of the control region is zero (0).

Additionally or alternatively, some examples may include features, means, or instructions for identifying a second system configuration of a second cell, determining a second PBCH configuration based on the second system configuration, wherein the second PBCH configuration is different from the PBCH configuration, and receiving a second PBCH transmission based on the second PBCH configuration.

In some examples of the method, apparatuses, or non-transitory computer-readable medium described above, determining the PBCH configuration comprises determining the PBCH configuration based at least in part on a coverage enhancement for the UE. Additionally or alternatively, in some examples the UE is a machine type communication (MTC) device. In some examples, determining the PBCH configuration comprises determining an amount of PBCH repetition based at least in part on the identified system configuration.

A method of wireless communication at a base station is described. The method may include features, means, or instructions for identifying a system configuration of a cell, determining a PBCH configuration based at least in part on the system configuration, and transmitting a PBCH transmission to one or more UEs according to the PBCH configuration.

An apparatus for wireless communication at a base station is described. The apparatus may include means for identifying a system configuration of a cell, means for determining a PBCH configuration based at least in part on the system configuration, and means for transmitting a PBCH transmission to one or more UEs according to the PBCH configuration.

A further apparatus for wireless communication at a base station is described. The apparatus may include a processor, memory in electronic communication with the processor, and instructions stored in the memory. The instructions may be executable by the processor to cause the apparatus to identify a system configuration of a cell, determine a PBCH configuration based at least in part on the system configuration, and transmit a PBCH transmission to one or more UEs according to the PBCH configuration.

A non-transitory computer-readable medium storing code for wireless communication at a base station is described. The code may include instructions executable to identify a system configuration of a cell, determine a PBCH configuration based at least in part on the system configuration, and transmit a PBCH transmission to one or more UEs according to the PBCH configuration.

In some examples of the method, apparatuses, or non-transitory computer-readable medium described above, determining the PBCH configuration includes determining an amount of PBCH repetition based at least in part on the identified system configurations. In some examples of the method, apparatuses, or non-transitory computer-readable medium described above, identifying the system configuration includes identifying whether a TDD or an FDD scheme is being used by the system, and the PBCH configuration is determined based at least in part on whether the TDD or the FDD scheme is being used by the system. Additionally or alternatively, some examples may include features, means, or instructions for determining a first PBCH repetition amount for the FDD scheme, and determining a second PBCH repetition amount for the TDD scheme, wherein the second PBCH repetition amount is larger than the first PBCH repetition amount.

In some examples of the method, apparatuses, or non-transitory computer-readable medium described above, identifying the system configuration includes identifying a carrier type for the system, and the PBCH configuration is determined based at least in part on the identified carrier type. Additionally or alternatively, in some examples, identifying the system configuration includes identifying a CP type for the system, and the PBCH configuration is determined based at least in part on the identified CP type.

In some examples of the method, apparatuses, or non-transitory computer-readable medium described above, identifying the system configuration includes identifying a system bandwidth, and the PBCH configuration is determined based at least in part on the system bandwidth. Additionally or alternatively, some examples may include features, means, or instructions for determining a number of symbols for a control region corresponding to the system bandwidth, wherein the PBCH configuration is based at least in part on the number of symbols for the control region.

In some examples of the method, apparatuses, or non-transitory computer-readable medium described above, the system bandwidth is larger than ten (10) resource blocks, and determining the PBCH configuration based at least in part on three (3) symbols for a control region. Additionally or alternatively, in some examples, the system bandwidth is no more than ten (10) resource blocks, and determining the PBCH configuration based at least in part on four (4) symbols for a control region.

Some examples of the method, apparatuses, or non-transitory computer-readable medium described above may further include features, means, or instructions for identifying a second system configuration of a second cell, determining a second PBCH configuration based on the second system configuration, wherein the second PBCH configuration is different from the PBCH configuration, and transmitting a second PBCH transmission based at least in part on the second PBCH configuration. Additionally or alternatively, in some examples determining the PBCH configuration comprises determining the PBCH configuration based at least in part on a coverage enhancement for one or more of the UEs.

In some examples of the method, apparatuses, or non-transitory computer-readable medium described above, one or more of the UEs is an MTC device. In some examples, determining the PBCH configuration comprises determining an amount of PBCH repetition based at least in part on the identified system configuration.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
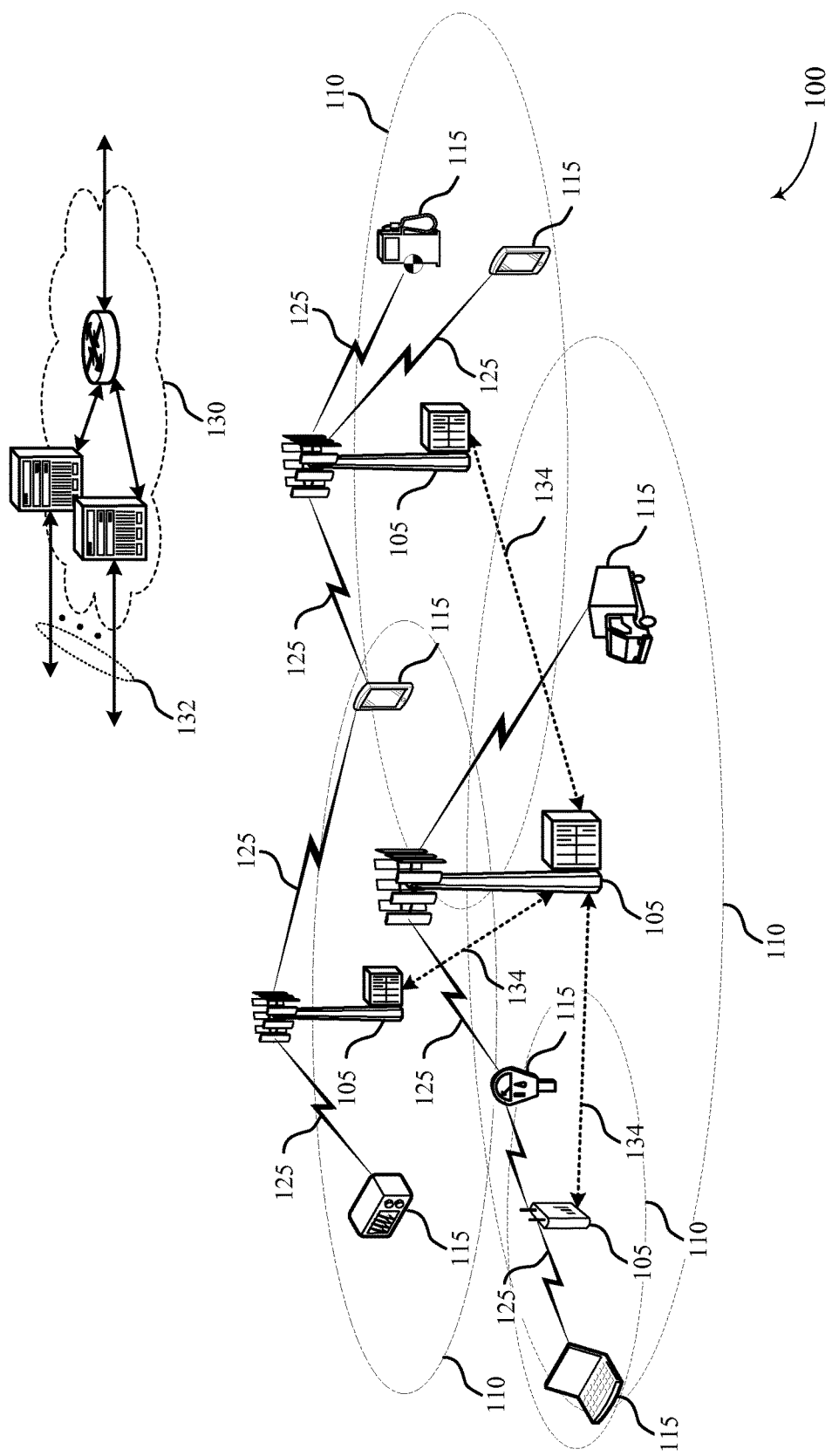
FIG. 1 illustrates an example of a wireless communications system that supports physical broadcast channel (PBCH) for coverage enhancement in accordance with various aspects of the present disclosure.

Some wireless systems may provide for automated communication known as Machine-to-Machine (M2M) communication or Machine Type Communication (MTC). M2M or MTC may refer to technologies or devices, such as user equipment (UEs) that communicate without human intervention. In some cases, MTC devices may have limited capabilities. For example, while some MTC devices may have broadband capacity, other MTC devices may be limited to narrowband communications. This narrowband limitation may, for example, interfere with the ability of an MTC device to receive control channel information using the full bandwidth served by a base station. In some wireless communication systems, such as systems configured according to the Long Term Evolution (LTE) communications standard, an MTC device having limited bandwidth capability (or another device with similar capabilities) may be referred to as a category 0 device.

In some cases, MTC devices may have reduced peak data rates (e.g., a maximum transport block size may be 1000 bits). Additionally, an MTC device may have rank 1 transmission capability and one antenna for receiving. This may limit an MTC device to half-duplex communication (i.e., the device may not be capable of simultaneously transmitting and receiving). If an MTC device is half-duplex, it may have relaxed switching time (e.g., from transmission (Tx) to reception (Rx) or vice versa). For example, a nominal switching time for a non-MTC device may be 20 μs while a switching time for an MTC device may be 1 ms. MTC enhancements (eMTC) in a wireless system may allow narrowband MTC devices to effectively operate within wider system bandwidth operations (e.g., 1.4/3/5/10/15/20 MHz). For example, an MTC device may support 1.4 MHz bandwidth (i.e., 6 resources blocks). In some instances, coverage enhancements of such MTC devices may be achieved by power boosting of, e.g., up to 15 dB.

According to the present disclosure, a base station may select a repetition level for PBCH based on system configuration parameters. A UE, such as an MTC device, may identify the system configuration. For example, the UE may assume a system bandwidth, assume a control region size, or determine whether the cell is a time division duplexing (TDD) or frequency division duplexing (FDD) cell, or the UE may do each of these things. The UE may then determine a PBCH configuration based on the system configuration. For example, the PBCH repetition level may depend on the system configuration. The UE may then receive a PBCH transmission according to the PBCH configuration. If a different cell has a different system configuration, the UE may determine a different PBCH configuration and receive PBCH using a different repetition level and different resources.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The system 100 includes base stations 105, UEs 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier, or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. Some the UEs 115 may communicate with the base stations 105 using coverage enhancement techniques, include PBCH repetition.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc.

Carriers may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Special subframes may carry DL or UL traffic and may include a Guard Period (GP) between DL and UL traffic. Switching from UL to DL traffic may be achieved by setting a timing advance at the UE 115 without the use of special subframes or a guard period. UL-DL configurations with switch-point periodicity equal to the frame period (e.g., 10 ms) or half of the frame period (e.g., 5 ms) may also be supported.

For example, TDD frames may include one or more special frames, and the period between special frames may determine the TDD DL-to-UL switch-point periodicity for the frame. Use of TDD offers flexible deployments without requiring paired UL-DL spectrum resources. In some TDD network deployments, interference may be caused between UL and DL communications (e.g., interference between UL and DL communication from different base stations, interference between UL and DL communications from base stations and UEs, etc.). For example, where different base stations 105 serve different UEs 115 within overlapping coverage areas according to different TDD UL-DL configurations, a UE 115 attempting to receive and decode a DL transmission from a serving base station 105 can experience interference from UL transmissions from other, proximately located UEs 115. In some cases, the frame structure may— e.g., whether a TDD or FDD scheme is employed—may be referred to as a system configuration, and may affect a PBCH configuration.

In some examples of the system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Data may be divided into logical channels, transport channels, and physical layer channels. DL physical channels may include PBCH for broadcast information, physical control format indicator channel (PCFICH) for control format information, physical downlink control channel (PDCCH) for control and scheduling information, PHICH for HARQ status messages, physical downlink shared channel (PDSCH) for user data and physical multicast channel (PMCH) for multicast data. UL physical channels may include physical random access channel (PRACH) for access messages, physical uplink control channel (PUCCH) for control data, and physical uplink shared channel (PUSCH) for user data.

Time intervals in LTE may be expressed in multiples of a basic time unit (e.g., the sampling period, Ts=1/30,720,000 seconds). Time resources may be organized according to radio frames of length of 10 ms (Tf=307200·Ts), which may be identified by an SFN ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs).

LTE systems may utilize OFDMA on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guard band) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8, or 16 sub-bands.

A frame structure may be used to organize physical resources. A frame may be a 10 ms interval that may be further divided into 10 equally sized sub-frames. Each sub-frame may include two consecutive time slots. Each slot may include 6 or 7 OFDMA symbol periods. A resource element (RE) consists of one symbol period and one subcarrier (a 15 KHz frequency range). A resource block (RB) may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a CRS and a UE-specific RS (UE-RS). UE-RS may be transmitted on the resource blocks associated with PDSCH. The number of bits carried by each resource element may depend on the modulation scheme (the configuration of symbols that may be selected during each symbol period). Thus, the more resource blocks that a UE receives and the higher the modulation scheme, the higher the data rate may be for the UE.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. After receiving the PSS and SSS, the UE 115 may receive a MIB, which may be transmitted in the PBCH. The MIB may contain system bandwidth information, an SFN, and a PHICH configuration. After decoding the MIB, the UE 115 may receive one or more SIBs. For example, SIB1 may contain cell access parameters and scheduling information for other SIBs. Decoding SIB1 may enable the UE 115 to receive SIB2. SIB2 may contain RRC configuration information related to RACH procedures, paging, PUCCH, PUSCH, power control, SRS, and cell barring.

After completing initial cell synchronization, a UE 115 may decode the master information block (MIB), system information block (SIB1 and SIB2 prior to accessing the network. The MIB may be transmitted on PBCH and may, in certain examples, utilize the first four (4) orthogonal frequency division multiple access (OFDMA) symbols of the second slot of the first subframe of each radio frame. The PBCH may also be transmitted in the first four (4) symbols of the second slots subframes 1, 2, and 3. PBCH may use the middle six (6) resource block (RBs) (72 subcarriers) in the frequency domain. The MIB carries a few important pieces of information for UE initial access, including: DL channel bandwidth in term of RBs, physical HARQ indicator channel (PHICH) configuration (duration and resource assignment), and system frame number (SFN). A new MIB may be broadcast every fourth radio frame (SFN mod 4=0) at and rebroadcast every frame (10 ms). Each repetition may be scrambled with a different scrambling code.

After reading a MIB (either a new version or a copy), the UE 115 may can try different phases of a scrambling code until it gets a successful cyclic redundancy check (CRC) check. The phase of the scrambling code (0, 1, 2, or 3) may enable the UE 115 to identify which of the four repetitions has been received. Thus, the UE 115 may determine the current SFN by reading the SFN in the decoded transmission and adding the scrambling code phase. After receiving the MIB, a UE may receive one or more SIBs. Different SIBs may be defined according to the type of system information conveyed.

According to the present disclosure, a base station may select a repetition level for PBCH based on system configuration parameters. A UE, such as an MTC device, may identify the system configuration. For example, the UE may assume a system bandwidth, assume a control region size, and determine whether the cell is a TDD or FDD cell. The UE may then determine a PBCH configuration based on the system configuration. For example, the PBCH repetition level may depend on the system configuration. In some examples, and as discussed in detail below, PBCH may utilize OFDMA symbols more than the first four (4) symbols of the second slot of particular subframes depending on the PBCH repetition level. The UE may then receive a PBCH transmission according to the PBCH configuration. If a different cell has a different system configuration, the UE may determine a different PBCH configuration and receive PBCH using a different repetition level and different resources.

Figure 2:
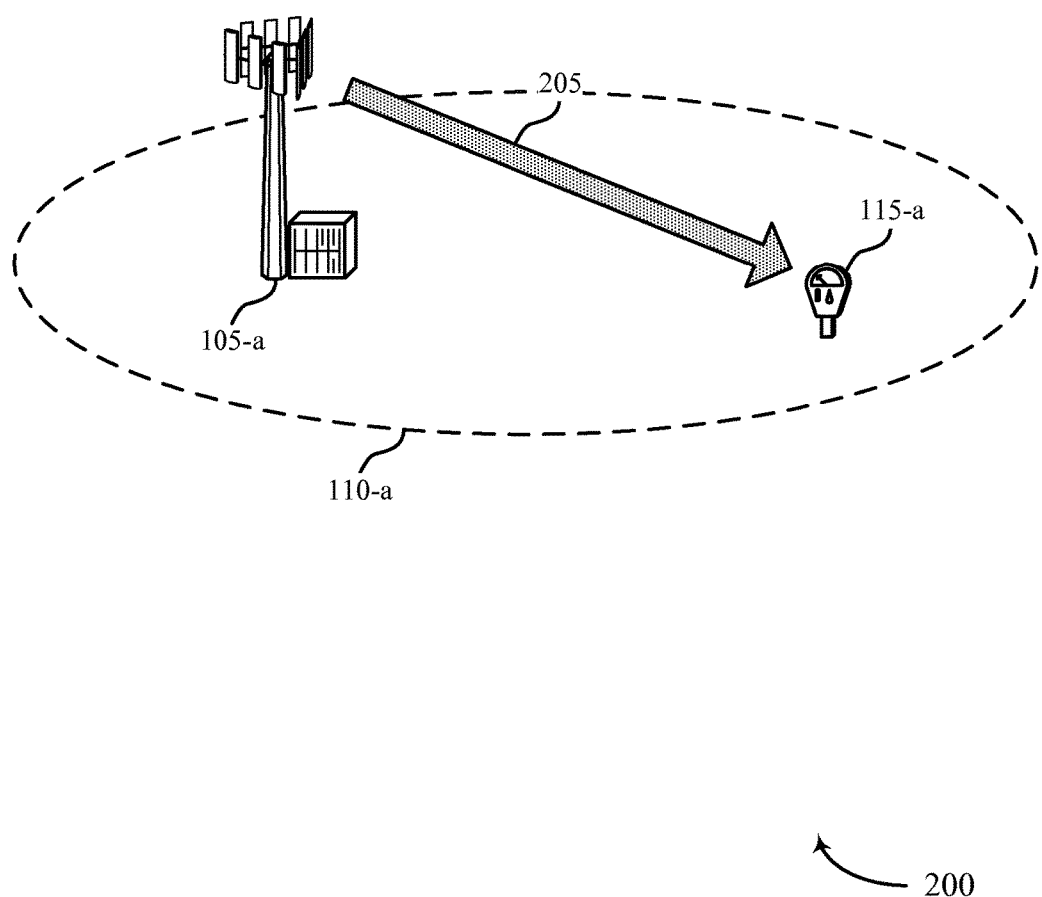
FIG. 2 illustrates an example of a wireless communications system that supports PBCH coverage enhancement in accordance with various aspects of the present disclosure.

FIG. 2 illustrates an example of a wireless communications system 200 that supports PBCH coverage enhancement in accordance with various aspects of the present disclosure. Wireless communications system 200 may include UE 115-a located within the coverage area of base station 105-a, which may be examples of a UE 115 and base station 105 described above with reference to FIG. 1. Wireless communications system 200 may also include downlink 205, which may include a PBCH as described with reference to FIG. 1. According to the present disclosure, base station 105-a may select a PBCH configuration for downlink 205 based on the system configuration. In some cases, UE 115-a may be an MTC device, and the PBCH may be based on coverage enhancement operations.

The PBCH configuration may include additional repetition of PBCH to improve reception by UE 115-a. For example, a rate matching scheme may be selected by base station 105-a for PBCH based on a number of resource elements (REs) available for transmission of PBCH. However, in some cases the PBCH configuration used by base station 105-a may not be known a priori to UE 115-a. Thus, UE 115-a may determine a PBCH configuration to use for reception of PBCH via downlink 205 based on known or assumed parameters of the system configuration and attempt to receive the MIB based on the identified configuration.

For example, if base station 105-a uses a TDD frame structure type, it may transmit additional PBCH repetitions based on REs in subframe 0 (e.g., SFN 0) or subframe 5 (e.g., SFN 5) available according to the TDD frame structure. Similarly, if base station 105-a uses an FDD frame structure type, it may transmit additional PBCH repetitions based on REs in subframe 0 or subframe 5 available according to the TDD frame structure. In some cases, UE 115-a may positively identify the frame structure type prior to receiving PBCH.

In some cases, the PBCH configuration may be based on a control region size of downlink 205. For example, the PBCH configuration may be based on a number of symbol periods used for transmission of PDCCH. UE 115-a may assume the size of the control region (e.g., assume it to be three (3) symbol periods or four (4) symbol periods) irrespective of system bandwidth. In other cases, UE 115-a may assume or estimate a system bandwidth and select a presumed control region size based on the system bandwidth. UE 115-a may then attempt to receive PBCH from base station 105-a according to a PBCH configuration based on the control region size. Other factors, such as carrier type and cyclic prefix (CP) type, may also influence the PBCH configuration selected by base station 105-a or assumed by UE 115-a.

Figure 3A:
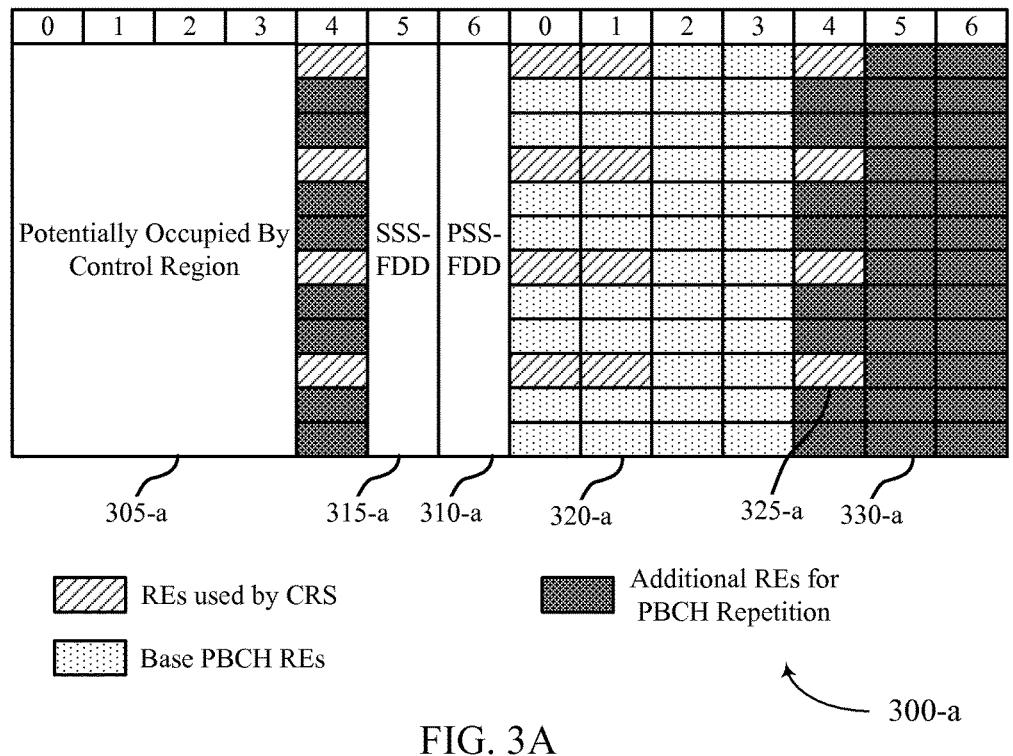
FIG. 3A illustrates an example of an FDD resource block pair for a subframe of index 0 with REs for PBCH repetition in accordance with various aspects of the present disclosure.

FIG. 3A illustrates an example of an FDD resource block pair 300-a for subframe 0 with REs for PBCH repetition in accordance with various aspects of the present disclosure. Resource block pair 300-a w may be used by a UE 115 and a base station 105 described above with reference to FIGS. 1-2. For example, FDD resource block pair 300-a may be an example of one PBCH configuration selected by a base station 105 and used for transmission and reception of PBCH based on the system configuration.

FDD resource block pair 300-a may represent a time period of a single 1ms subframe in the time domain and 12 subcarriers (e.g., of subcarrier bandwidth 15 KHz) in the frequency domain. FDD resource block pair 300-a may include a control region 305-a, which may occupy up to four (4) symbol periods at the beginning of the subframe. As illustrated, in some cases, the control region 305-a may not be used for PBCH repetition. However, in some cases, the control region may occupy fewer than four (4) symbols (e.g., three (3) symbols) and some REs in the indicated control region 305-a may be used for PBCH repetition.

FDD resource block pair 300-a may also include PSS region 310-a and SSS region 315-a used for transmission of synchronization signals. Base PBCH REs 320-a may be used for transmission of PBCH regardless of other aspects of the system configuration and irrespective of coverage enhancement operations. CRS region 325-a may be used for transmission of CRS. In some examples, a frequency shift of CRS in an RB may depend on an associated cell identity. The CRS region 325-a may represent one possible frequency shift, while other frequency shifts of CRS are also possible.

Additional PBCH REs 330-a may be used for repetition of PBCH according to the PBCH configuration selected by a base station 105. In some cases, additional PBCH REs 330-a may include all of the REs not occupied by control region 305-a, PSS region 310-a, SSS region 315-a, Base PBCH REs 320-a, and CRS region 325-a. Thus, in some cases, the PBCH configuration comprises Additional PBCH REs 330-a in the 5th, 12th, 13th, and 14th symbol period of a subframe of index 0. Accordingly, there may be 240 additional PBCH REs 330-a in the subframe.

Figure 3B:
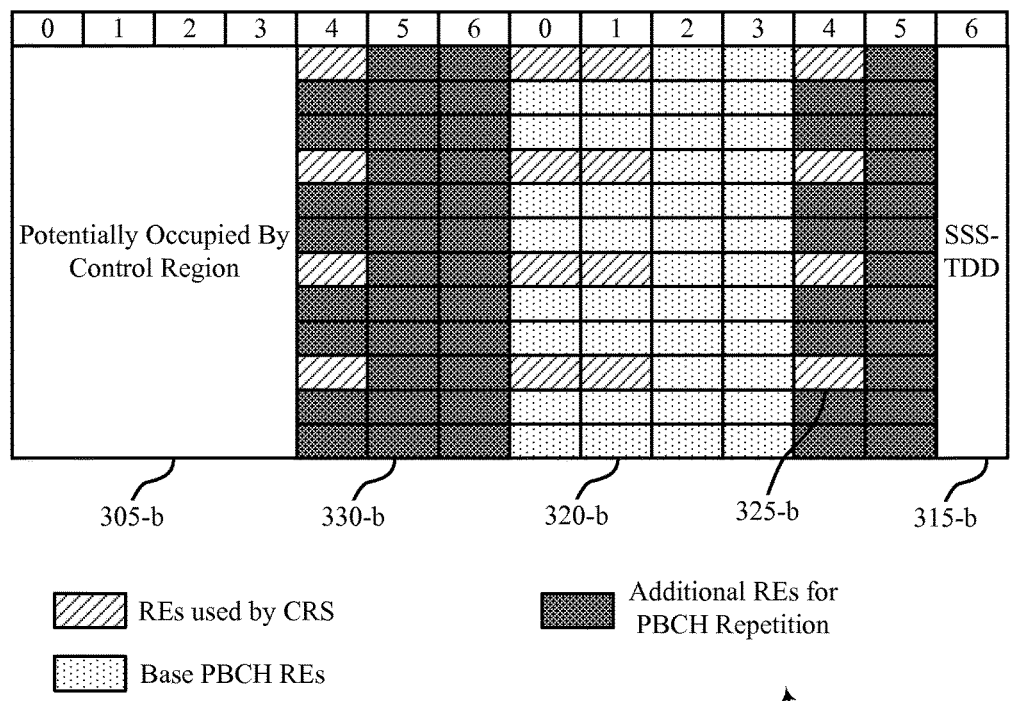
FIG. 3B illustrates an example of a TDD resource block pair for a subframe of index 0 with REs for PBCH repetition in accordance with various aspects of the present disclosure.

FIG. 3B illustrates an example of a TDD resource block pair 300-b for subframe 0 with REs for PBCH repetition in accordance with various aspects of the present disclosure. Resource block pair 300-b may be used by a UE 115 and a base station 105 described above with reference to FIGS. 1-2. For example, TDD resource block pair 300-b may be an example of one PBCH configuration selected by a base station 105 and used for transmission and reception of PBCH based on the system configuration.

TDD resource block pair 300-b may represent a time period of a single 1ms subframe in the time domain and 12 subcarriers (e.g., of subcarrier bandwidth 15 KHz) in the frequency domain. TDD resource block pair 300-b may include a control region 305-b, which may occupy up to four (4) symbol periods at the beginning of the subframe. As illustrated, in some cases the control region 305-b may not be used for PBCH repetition. However, in some cases, the control region may occupy fewer than four (4) symbols (e.g., three (3) symbols) and some REs in the indicated control region 305-b may be used for PBCH repetition.

TDD resource block pair 300-b may also include SSS region 315-b used for transmission of synchronization signals. Base PBCH REs 320-b may be used for transmission of PBCH regardless of other aspects of the system configuration and irrespective of coverage enhancement operations. CRS region 325-b may be used for transmission of CRS.

Additional PBCH REs 330-b may be used for repetition of PBCH according to the PBCH configuration selected by a base station 105. In some cases, additional PBCH REs 330-b may include all of the REs not occupied by control region 305-b, SSS region 315-b, Base PBCH REs 320-b, and CRS region 325-b. Thus, in some cases, the PBCH configuration includes Additional PBCH REs 330-b in the 5th, 6th, 7th, 12th, and 13th symbol period of a subframe of index 0. Accordingly, there may be 312 additional PBCH REs 330-b in the subframe. Compared with 240 additional PBCH REs if four (4) symbol periods are used, this configuration may provide for 30-percent more REs It may also provide for 15-percent more REs for a PBCH transmission in subframe 0 (e.g., based on a comparison between 552 REs and 480 REs associated with different repetition levels), which may result in a roughly 0.6 dB coverage enhancement.

Figure 3C:
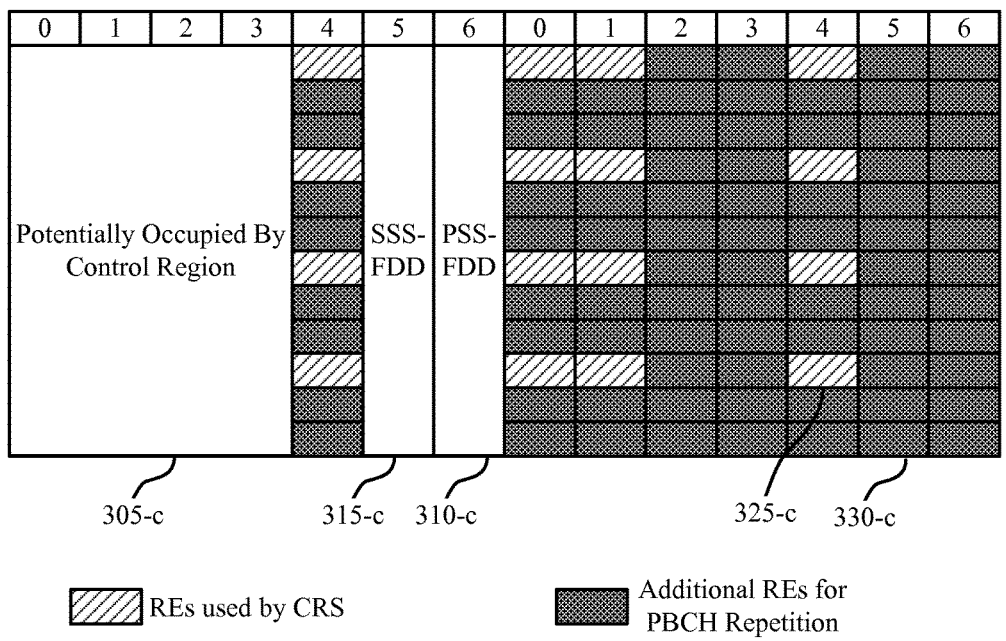
FIG. 3C illustrates an example of a FDD resource block pair for a subframe of index 5 with REs for PBCH repetition in accordance with various aspects of the present disclosure.

FIG. 3C illustrates an example of an FDD resource block pair 300-c for subframe 5 with REs for PBCH repetition in accordance with various aspects of the present disclosure. Resource block pair 300-c w may be used by a UE 115 and a base station 105 described above with reference to FIGS. 1-2. For example, FDD resource block pair 300-c may be an example of one PBCH configuration selected by a base station 105 and used for transmission and reception of PBCH based on the system configuration.

FDD resource block pair 300-c may represent a time period of a single 1ms subframe in the time domain and 12 subcarriers (e.g., of subcarrier bandwidth 15 KHz) in the frequency domain. FDD resource block pair 300-c may include a control region 305-c, which may occupy up to four (4) symbol periods at the beginning of the subframe. As illustrated, in some cases, the control region 305-c may not be used for PBCH repetition. However, in some cases, the control region may occupy fewer than four (4) symbols (e.g., three (3) symbols) and some REs in the indicated control region 305-c may be used for PBCH repetition.

FDD resource block pair 300-c may also include PSS region 310-c and SSS region 315-c used for transmission of synchronization signals. CRS region 325-c may be used for transmission of CRS.

Additional PBCH REs 330-c may be used for repetition of PBCH according to the PBCH configuration selected by a base station 105. In some cases, additional PBCH REs 330-c may include all of the REs not occupied by control region 305-a, PSS region 310-a, SSS region 315-c, and CRS region 325-c. Thus, in some cases, the PBCH configuration includes Additional PBCH REs 330-c in the 5th, 8th, 9th, 10th, 11th, 12th, 13th, and 14th symbol period of a subframe of index 5. Accordingly, there may be 480 additional PBCH REs 330-a in the subframe.

Figure 3D:
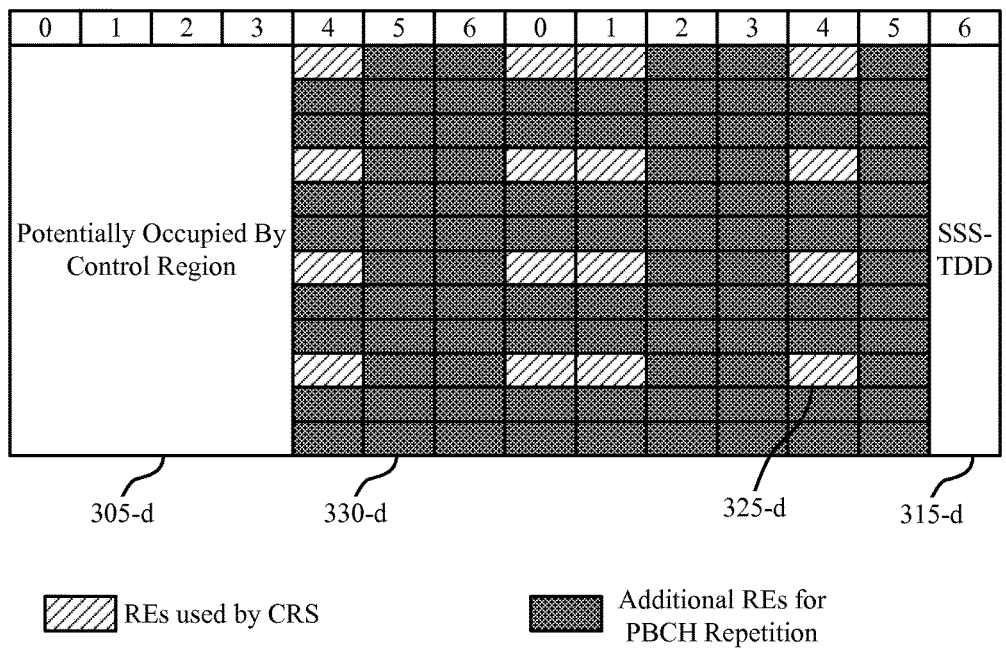
FIG. 3D illustrates an example of a TDD resource block pair for a subframe of index 5 with REs for PBCH repetition in accordance with various aspects of the present disclosure.

FIG. 3D illustrates an example of a TDD resource block pair 300-b for subframe 5 with REs for PBCH repetition in accordance with various aspects of the present disclosure. Resource block pair 300-d may be used by a UE 115 and a base station 105 described above with reference to FIGS. 1-2. For example, TDD resource block pair 300-d may be an example of one PBCH configuration selected by a base station 105 and used for transmission and reception of PBCH based on the system configuration.

TDD resource block pair 300-d may represent a time period of a single 1 ms subframe in the time domain and 12 subcarriers (e.g., of subcarrier bandwidth 15 KHz) in the frequency domain. TDD resource block pair 300-b may include a control region 305-d, which may occupy up to four (4) symbol periods at the beginning of the subframe. As illustrated, in some cases the control region 305-*b* may not be used for PBCH repetition. However, in some cases, the control region may occupy fewer than four (4) symbols (e.g., three (3) symbols) and some REs in the indicated control region 305-*b* may be used for PBCH repetition.

TDD resource block pair 300-*d* may also include SSS region 315-*d* used for transmission of synchronization signals. CRS region 325-*d* may be used for transmission of CRS.

Additional PBCH REs 330-*b* may be used for repetition of PBCH according to the PBCH configuration selected by a base station 105. In some cases, additional PBCH REs 330-*d* may include all of the REs not occupied by control region 305-*d*, SSS region 315-*d*, and CRS region 325-*d*. Thus, in some cases, the PBCH configuration includes Additional PBCH REs 330-*d* in the 5th, 6th, 7th, 8th, 9th, 10th, 11th, 12th, and 13th symbol period of a subframe of index 5. Accordingly, there may be 552 additional PBCH REs 330-*d* in the subframe. This configuration may therefore provide for 15-percent more REs per PBCH per subframe 5; and it may provide for 15-percent more REs for a PBCH transmission, which may result in a roughly 0.6 dB coverage enhancement.

Figure 4:
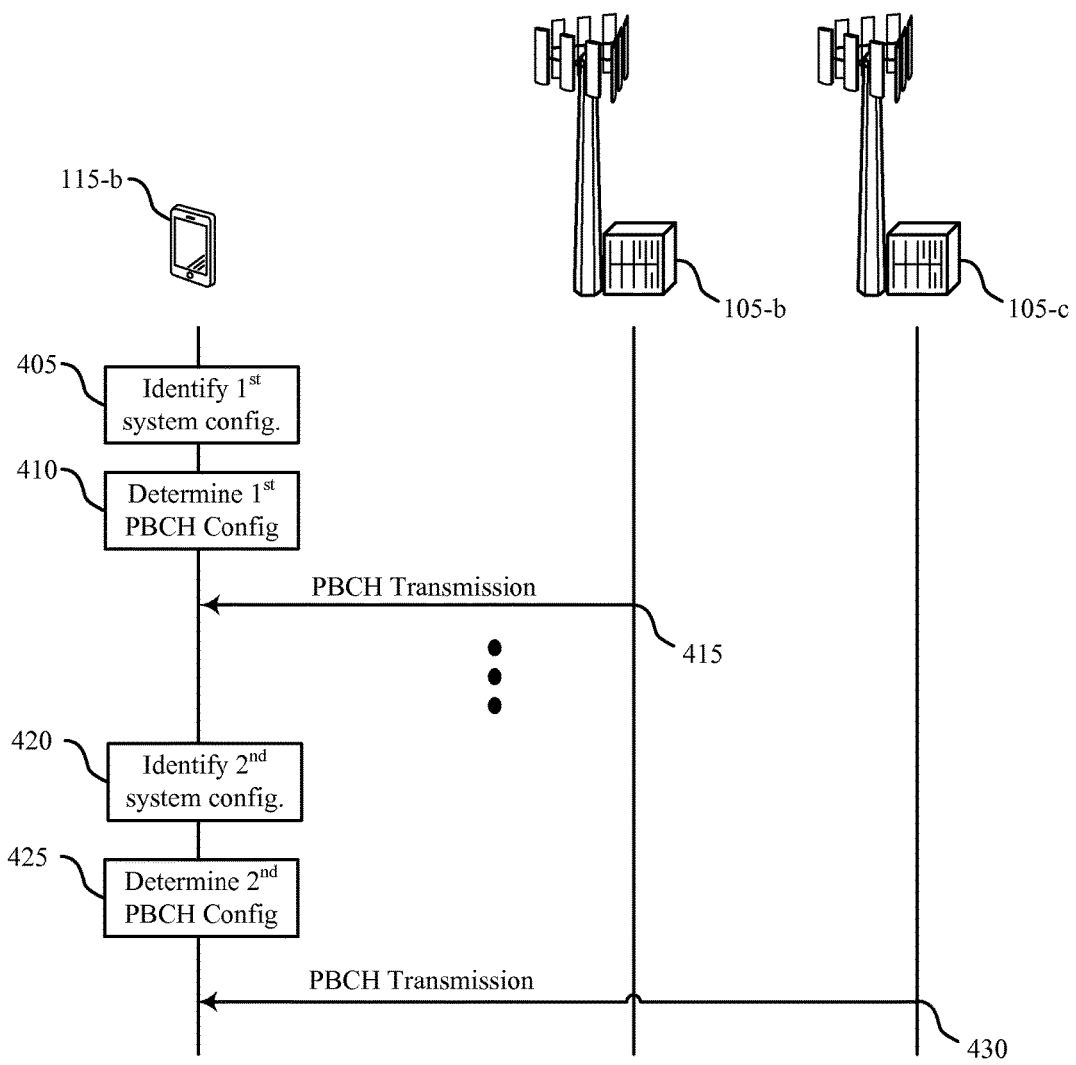
FIG. 4 illustrates an example of a process flow for a system that supports PBCH coverage enhancement in accordance with various aspects of the present disclosure.

FIG. 4 illustrates an example of a process flow 400 for systems that support PBCH coverage enhancement in accordance with various aspects of the present disclosure. Process flow 400 may include a UE 115-*b*, which may be an example of a UE 115 described above with reference to FIGS. 1-2. Process flow 400 may also include a base station 105-*b* and base station 105-*c*, which may be examples of base stations 105 described above with reference to FIGS. 1-2. In some cases, additional UEs 115 (not shown) may also receive PBCH and other transmissions of process flow 400.

At step 405, UE 115-*b* may identify a system configuration of a cell served by base station 105-*b*. In some examples, identifying the system configuration includes identifying a frame structure type (e.g., TDD or FDD), identifying a carrier type, identifying a cyclic prefix (CP) type, assuming a system bandwidth, or assuming a control region size. The UE 115 may determine a number of symbols for a control region corresponding to the assumed system bandwidth, where the PBCH configuration may be based on the number of symbols for the control region. In some examples, the assumed system bandwidth is larger than ten (10) resource blocks. The UE 115 may, for example, determine that the PBCH configuration is based on three (3) symbols for a control region. This assumption may provide for an approximately 0.6 dB coverage enhancement for an FDD subframe 0 (e.g., a 15-percent increase of REs). Alternatively, for a TDD subframe 0, this assumption may provide for an approximately 1.1 dB coverage enhancement (e.g., a 30-percent increase of REs).

In some examples, the assumed system bandwidth includes a bandwidth of no more than ten (10) resource blocks. The UE 115 may thus determine, for example, that the PBCH configuration based on four (4) symbols for a control region. In some examples, receiving the PBCH transmission includes performing PBCH detection based on an assumed size of a control region, irrespective of a system bandwidth. For instance, the assumed size of the control region may be three (3) symbols. In some examples, the assumed size of the control region size is zero (0)—e.g., zero (0) symbols. Assumptions in control region size may effectively restrict a control transmissions in subframes where PBCH is transmitted; but a base station may dynamically control PCFICH values, and thus the control region size, so such a restriction may be handled by appropriate scheduling at the base station.

At step 410, UE 115-*b* may determine a PBCH configuration based on the system configuration. For example, UE 115-*b* may determine a PBCH repetition amount. In some examples the PBCH configuration (including the repetition amount) is determined based on the frame structure type, carrier type, CP type, assumed system bandwidth, or assumed control region size. The PBCH configuration may be selected by base station 105-*b* based on the system configuration. In some cases, the PBCH configuration determined by UE 115-*a* may not correspond exactly to the PBCH configuration selected by base station 105-*b*. For example, UE 115-*b* may assume a bandwidth or control region size that is not actually used by base station 105-*b*. In some examples, determining the PBCH configuration comprises determining an amount of PBCH repetition based at least in part on the identified system configuration.

In some examples, the system bandwidth is larger than ten (10) resource blocks and the PBCH configuration may be based on three symbols for a control region. In some examples, the system bandwidth is less than or equal to ten (10) resource blocks and the PBCH configuration may be based on four (4) symbols for the control region. In some examples, a UE may perform hypotheses detection by assuming a control size for a system bandwidth with a plurality of possible system bandwidths. As an example, UE 115-*a* may make the follow two hypothesis: 1) a system bandwidth of ten (10) RBs or less and PBCH transmission based on an assumption of four (4) symbols for a control region; and 2) a system bandwidth of more than ten (10) RBs and PBCH transmission based on an assumption of three (3) symbols for a control region. The UE 115-*a* may perform PBCH detection based on the two hypotheses. After detecting PBCH, which may contain the actual system bandwidth, the UE 115-*a* may further check whether the indicated system bandwidth in PBCH is consistent with the assumed system bandwidth for the corresponding PBCH detection. In some cases, UE 115-*b* may assume the control region size based on an estimated system bandwidth, but in other cases UE 115-*b* may assume a control region size (e.g., three of four symbols) irrespective of system bandwidth.

At step 415, UE 115-*b* may receive a PBCH transmission from base station 105-*b* according to the selected PBCH configuration. That is, UE 115-*b* may estimate the selected PBCH configuration and use the estimated configuration to receive PBCH, while the actual PBCH configuration may be used by base station 105-*b* to transmit PBCH.

At step 420, UE 115-*b* may identify a second system configuration of a cell served by base station 105-*c*. The second system configuration may be different from the first system configuration. For example, the frame structure type, carrier type, CP type, assumed system bandwidth or assumed control region size may be different.

At step 425, UE 115-*b* may determine a second PBCH configuration based on the second system configuration of base station 105-*c*. For example, UE 115-*b* may determine a second PBCH repetition amount. The second PBCH configuration and the second PBCH repetition amount of base station 105-*c* may be different from the first PBCH configuration and the first PBCH repetition amount of base station 105-*b* based on the different system configuration.

At step 430, UE 115-*b* may receive a PBCH transmission from base station 105-*c* according to the second PBCH configuration. That is, UE 115-*b* may estimate the selected PBCH configuration of base station 105-*c* and use the estimated configuration to receive PBCH, while the actual PBCH configuration may be used by base station 105-*c* to transmit PBCH.

Figure 5:
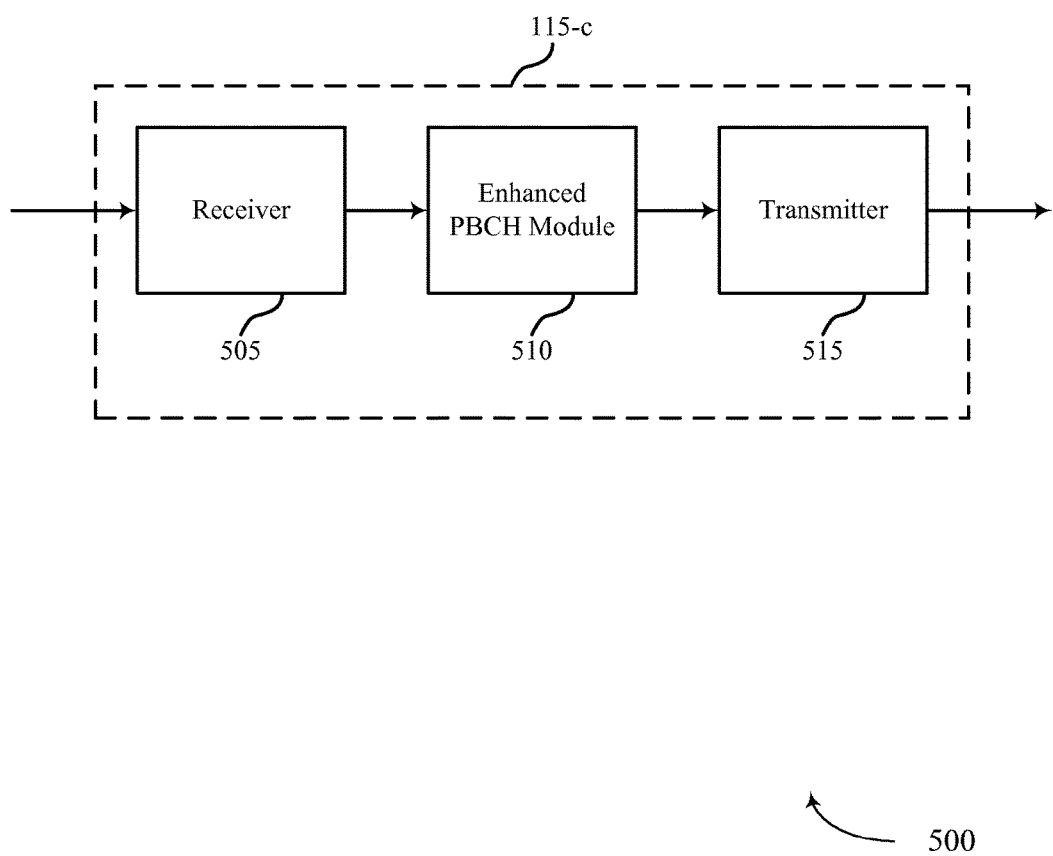
FIG. 5 shows a block diagram of a user equipment (UE) device that supports PBCH coverage enhancement in accordance with various aspects of the present disclosure.

FIG. 5 shows a block diagram 500 of a UE 115-*c* that supports PBCH coverage enhancement in accordance with various aspects of the present disclosure. UE 115-*c* may be an example of aspects of a UE 115 described with reference to FIGS. 1-4. UE 115-*c* may include a receiver 505, an enhanced PBCH module 510, or a transmitter 515. UE 115-*c* may also include a processor. Each of these components may be in communication with one another.

The receiver 505 may receive information such as packets, user data, or control information associated with various information channels (e.g., control channels, data channels, and information related to PBCH for coverage enhancement, etc.). Information may be passed on to the enhanced PBCH module 510, and to other components of UE 115-*c*.

The enhanced PBCH module 510 may identify a system configuration of a cell, determine a PBCH configuration based on the system configuration, and, in combination with receiver 505, it may receive a PBCH transmission according to the PBCH configuration.

The transmitter 515 may transmit signals received from other components of UE 115-*c*. In some examples, the transmitter 515 may be collocated with the receiver 505 in a transceiver module. The transmitter 515 may include a single antenna, or it may include a plurality of antennas.

Figure 6:
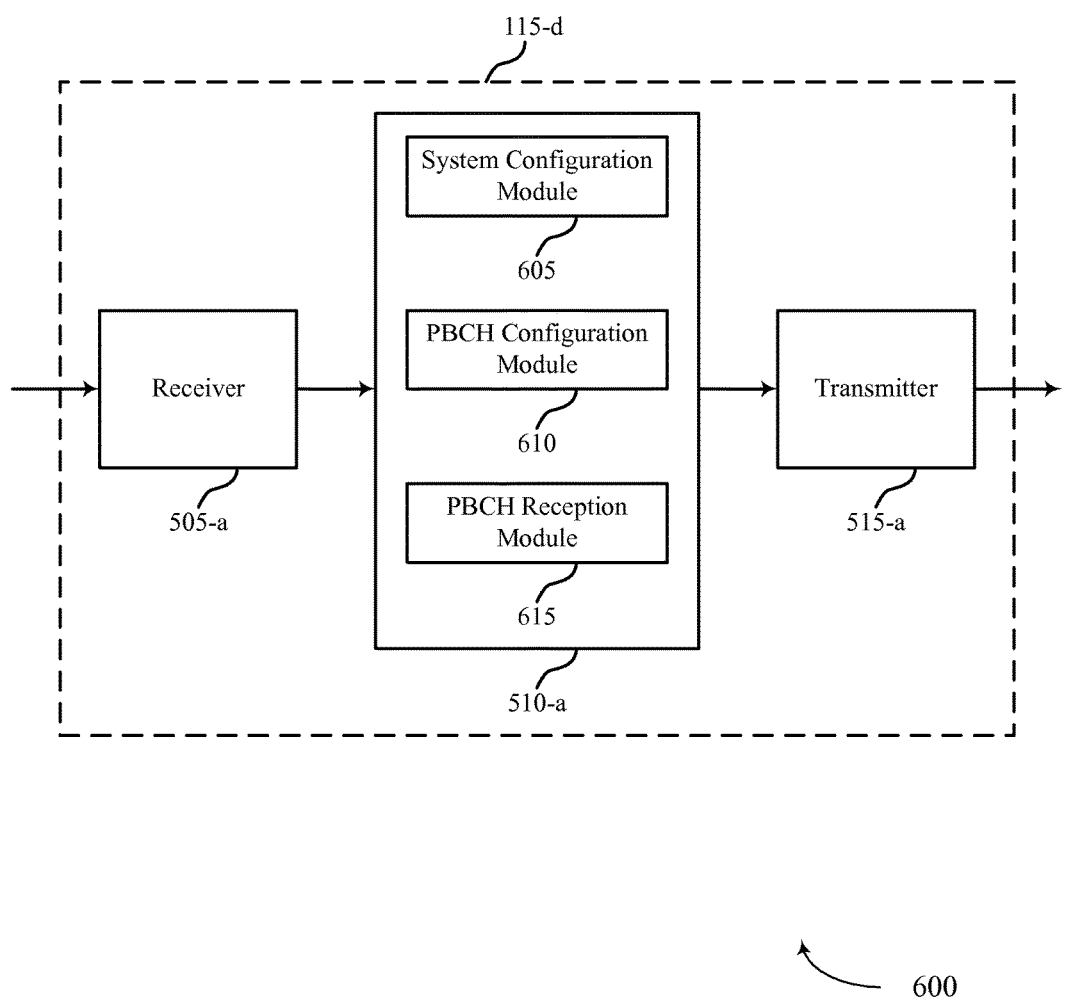
FIG. 6 shows a block diagram of a UE that supports PBCH coverage enhancement in accordance with various aspects of the present disclosure.

FIG. 6 shows a block diagram 600 of a UE 115-*d* that supports PBCH coverage enhancement in accordance with various aspects of the present disclosure. UE 115-*d* may be an example of aspects of a UE 115 described with reference to FIGS. 1-5. UE 115-*d* may include a receiver 505-*a*, an enhanced PBCH module 510-*a*, or a transmitter 515-*a*. UE 115-*d* may also include a processor. Each of these components may be in communication with one another. The enhanced PBCH module 510-*a* may also include a system configuration module 605, a PBCH configuration module 610, and a PBCH reception module 615.

The receiver 505-*a* may receive information which may be passed on to enhanced PBCH module 510-*a*, and to other components of UE 115-*d*. The enhanced PBCH module 510-*a* may perform the operations described above with reference to FIG. 5. The transmitter 515-*a* may transmit signals received from other components of UE 115-*d*.

The system configuration module 605 may identify a system configuration of a cell as described above with reference to FIGS. 2-4. The system configuration module 605 may also identify a second system configuration of a second cell.

The PBCH configuration module 610 may determine a PBCH configuration based on the system configuration as described above with reference to FIGS. 2-4. The PBCH configuration module 610 may also determine a second PBCH configuration based on the second system configuration, where the second PBCH configuration is different from the PBCH configuration.

The PBCH reception module 615 may receive a PBCH transmission according to the PBCH configuration as described above with reference to FIGS. 2-4. The PBCH reception module 615 may also receive a second PBCH transmission based on the second PBCH configuration.

Figure 7:
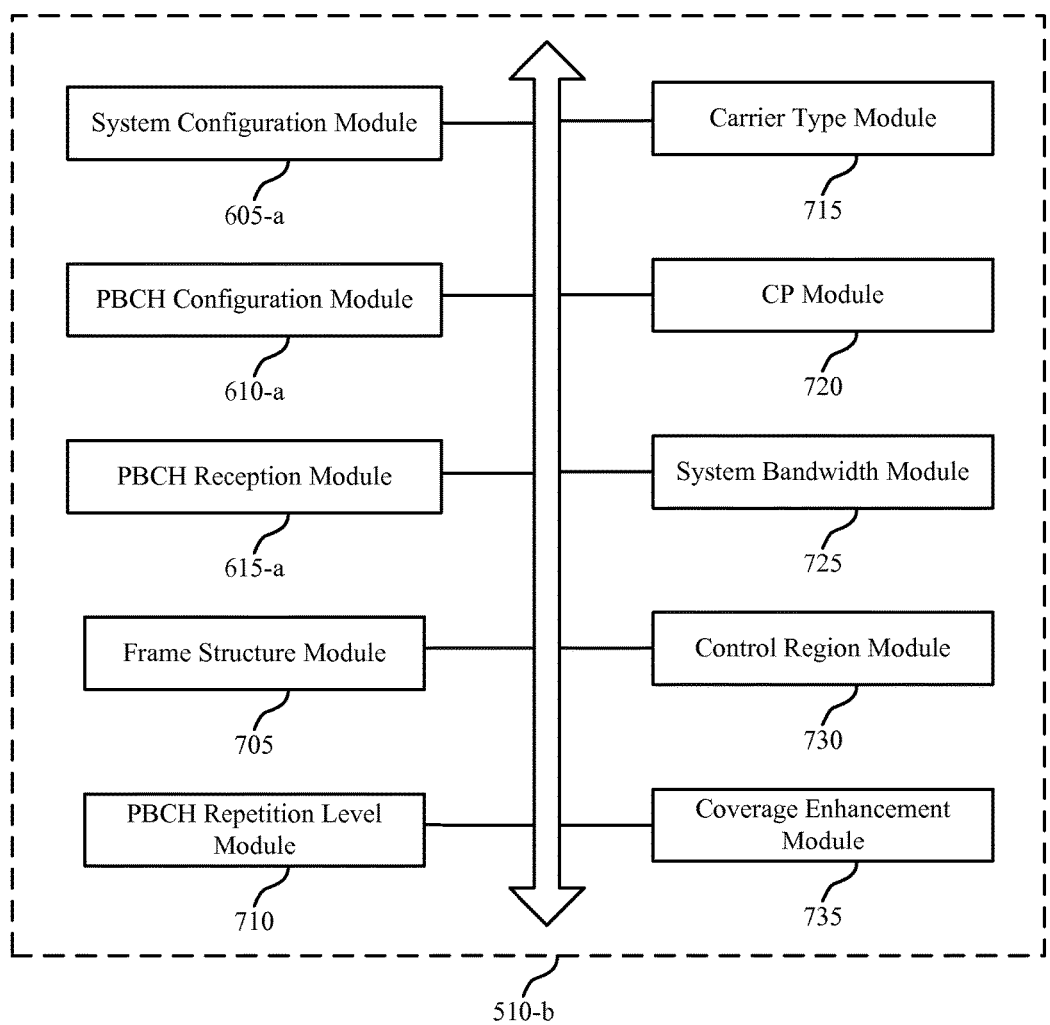
FIG. 7 shows a block diagram of an enhanced PBCH module that supports PBCH coverage enhancement in accordance with various aspects of the present disclosure.

FIG. 7 shows a block diagram 700 of an enhanced PBCH module 510-*b* that supports PBCH coverage enhancement in accordance with various aspects of the present disclosure. The enhanced PBCH module 510-*b* may be an example of aspects of an enhanced PBCH module 510 described with reference to FIGS. 5-6. The enhanced PBCH module 510-*b* may include a system configuration module 605-*a*, a PBCH configuration module 610-*a*, and a PBCH reception module 615-*a*. Each of these modules may perform the functions described above with reference to FIG. 6. The enhanced PBCH module 510-*b* may also include a frame structure module 705, a PBCH repetition level module 710, a carrier type module 715, a CP module 720, a system bandwidth module 725, a control region module 730, and a coverage enhancement module 735.

The frame structure module 705 may be configured to identify the system configuration, which may include identifying whether a TDD or an FDD scheme is being used by the system as described above with reference to FIGS. 2-4. In some examples, the PBCH configuration may be determined based at least in part on whether the TDD or the FDD scheme is being used by the system. In some examples, the PBCH configuration may be determined based on whether the TDD or the FDD scheme is being used by the system.

The PBCH repetition level module 710 may determine a first PBCH repetition amount for an FDD scheme as described above with reference to FIGS. 2-4. The PBCH repetition level module 710 may also determine a second PBCH repetition amount for the TDD scheme, where the second PBCH repetition amount is larger than the first PBCH repetition amount. The PBCH repetition level module 710 may also determine a second PBCH repetition amount for a TDD scheme, where the second PBCH repetition amount is larger than the first PBCH repetition amount.

The carrier type module 715 may be configured to identify the system configuration, which may include identifying a carrier type for the system as described above with reference to FIGS. 2-4. In some examples, the PBCH configuration may be determined based at least in part on the identified carrier type.

The CP module 720 may be configured to identify the system configuration, which may include identifying a CP type for the system as described above with reference to FIGS. 2-4. In some examples, the PBCH configuration may be determined based at least in part on the identified CP type.

The system bandwidth module 725 may be configured to identify the system configuration, which may include assuming a system bandwidth as described above with reference to FIGS. 2-4. In some examples, the PBCH configuration may be determined based at least in part on the assumed system bandwidth.

The control region module 730 may determine a number of symbols for a control region corresponding to the assumed system bandwidth, and the PBCH configuration may be based at least in part on the number of symbols for the control region as described above with reference to FIGS. 2-4. In some examples, the assumed system bandwidth may be larger than ten (10) resource blocks and the PBCH configuration may be based at least in part on three symbols for a control region. While in some examples, the assumed system bandwidth may be no more than ten (10) resource blocks and the PBCH configuration may be based at least in part on four symbols for a control region. Receiving the PBCH transmission may include performing PBCH detection based on an assumed size of a control region, irrespective of a system bandwidth. For instance, the assumed size of the control region may be three (3) symbols. In some examples, the assumed size of the control region may be zero (0) (e.g., no control symbols).

The coverage enhancement module 735 may be configured to determine the PBCH configuration, which may include determining the PBCH configuration based at least in part on a coverage enhancement for the UE as described above with reference to FIGS. 2-4.

The components of UE 115-c, UE 115-d, or enhanced PBCH module 510-b may, individually or collectively, be implemented with at least one application specific integrated circuit (ASIC) adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 8:
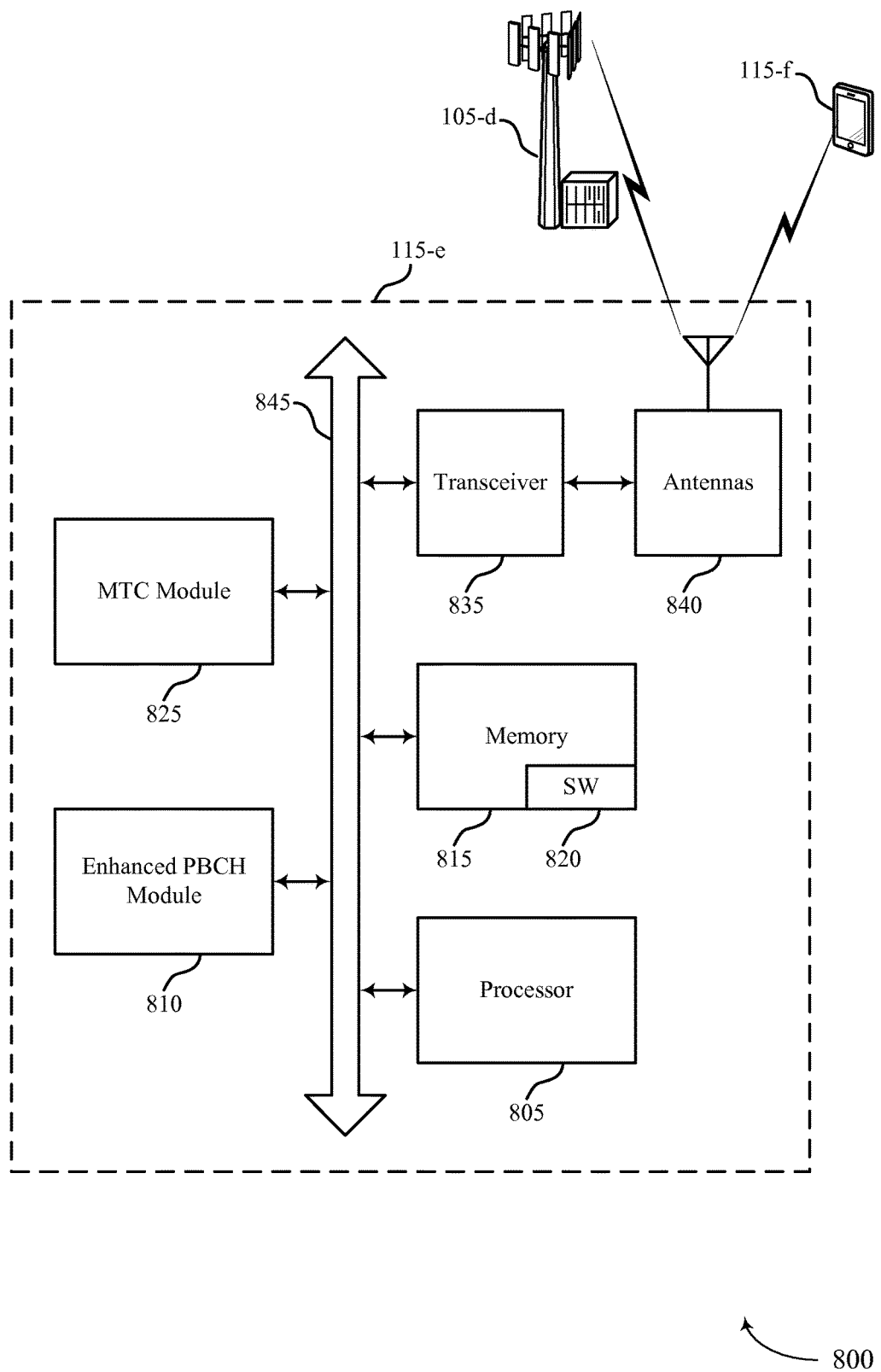
FIG. 8 illustrates a block diagram of a system, including a UE, that supports PBCH coverage enhancement in accordance with various aspects of the present disclosure.

FIG. 8 shows a diagram of a system 800 including a UE 115 that supports PBCH coverage enhancement in accordance with various aspects of the present disclosure. System 800 may include UE 115-e, which may be an example of a UE 115 described above with reference to FIGS. 1-7. UE 115-e may include an enhanced PBCH module 810, which may be an example of an enhanced PBCH module 510 described with reference to FIGS. 5-7. UE 115-e may also include a MTC module 825. UE 115-e may also include components for bi-directional voice and data communications including components for transmitting communications and components for receiving communications. For example, UE 115-e may communicate bi-directionally with UE 115-f or base station 105-d.

The MTC module 825 may be configured to perform MTC procedures (e.g., for coverage enhancement and battery conservation). For example, the MTC module 825 may perform MTC procedures if the UE 115-e is an MTC device as described above with reference to FIGS. 2-4.

UE 115-e may also include a processor module 805, and memory 815 (including software (SW) 820), a transceiver module 835, and one or more antenna(s) 840, each of which may communicate, directly or indirectly, with one another (e.g., via buses 845). The transceiver module 835 may communicate bi-directionally, via the antenna(s) 840 or wired or wireless links, with one or more networks, as described above. For example, the transceiver module 835 may communicate bi-directionally with a base station 105 or another UE 115. The transceiver module 835 may include a modem to modulate the packets and provide the modulated packets to the antenna(s) 840 for transmission, and to demodulate packets received from the antenna(s) 840. While UE 115-e may include a single antenna 840, UE 115-e may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor module 805 to perform various functions described herein (e.g., PBCH for coverage enhancement, etc.). Alternatively, the software/firmware code 820 may not be directly executable by the processor module 805 but cause a computer (e.g., when compiled and executed) to perform functions described herein. The processor module 805 may include an intelligent hardware device, (e.g., a central processing unit (CPU), a microcontroller, an ASIC, etc.)

Figure 9:
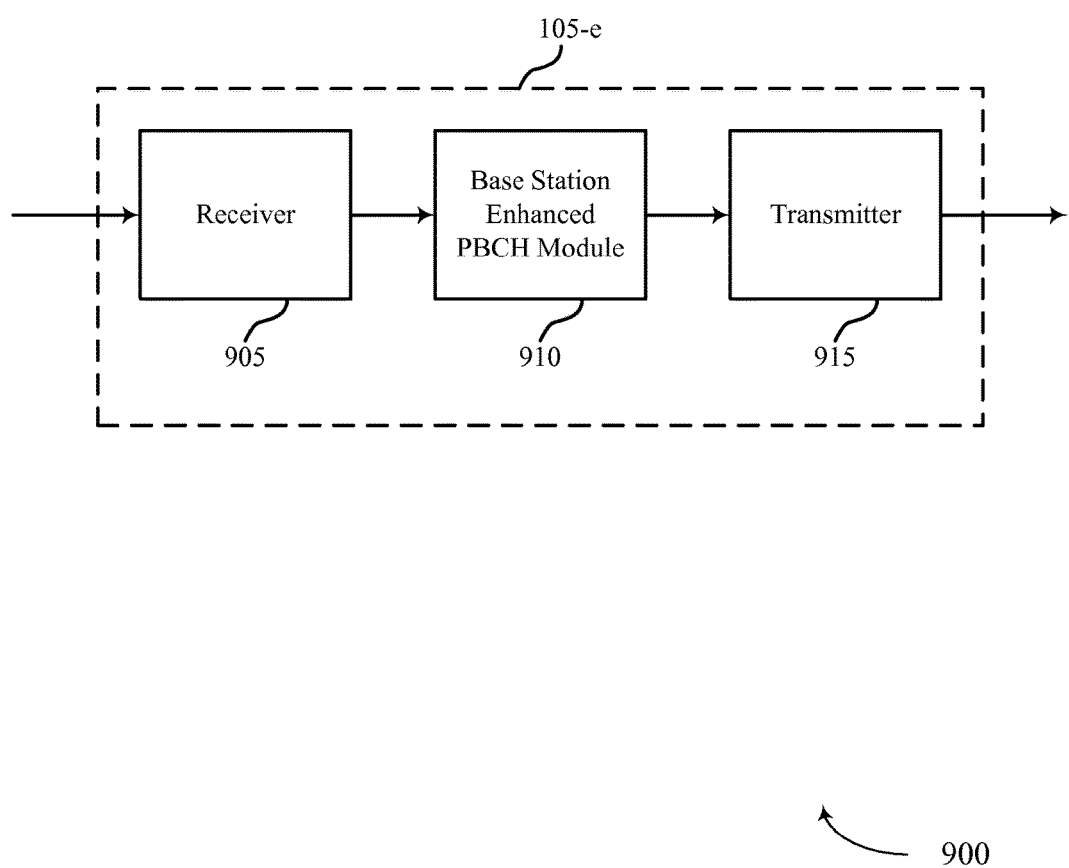
FIG. 9 shows a block diagram of a base station that supports PBCH coverage enhancement in accordance with various aspects of the present disclosure.

FIG. 9 shows a block diagram 900 of a base station 105-e that supports PBCH coverage enhancement in accordance with various aspects of the present disclosure. Base station 105-e may be an example of aspects of a base station 105 described with reference to FIGS. 1-8. Base station 105-e may include a receiver 905, a base station (BS) enhanced PBCH module 910, or a transmitter 915. Base station 105-e may also include a processor. Each of these components may be in communication with one another.

The receiver 905 may receive information such as packets, user data, or control information associated with various information channels (e.g., control channels, data channels, and information related to PBCH for coverage enhancement, etc.). Information may be passed on to the BS enhanced PBCH module 910, and to other components of base station 105-e.

The BS enhanced PBCH module 910 may identify a system configuration of a cell, determine a PBCH configuration based at least in part on the system configuration, and, in combination with transmitter 915, transmit a PBCH transmission to one or more UEs according to the PBCH configuration.

The transmitter 915 may transmit signals received from other components of base station 105-e. In some examples, the transmitter 915 may be collocated with the receiver 905 in a transceiver module. The transmitter 915 may include a single antenna, or it may include several of antennas.

Figure 10:
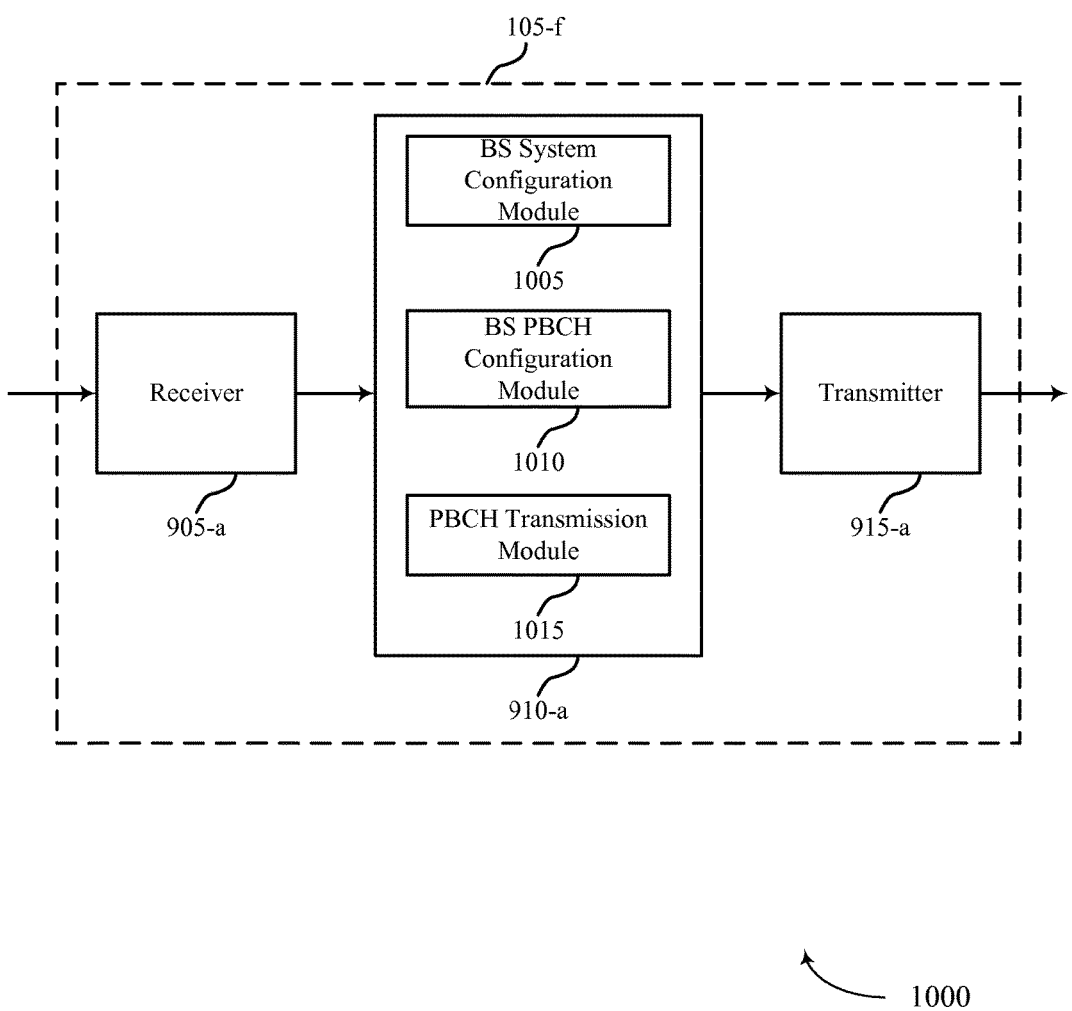
FIG. 10 shows a block diagram of a base station that supports PBCH coverage enhancement in accordance with various aspects of the present disclosure.

FIG. 10 shows a block diagram 1000 of a base station 105-f that supports PBCH coverage enhancement in accordance with various aspects of the present disclosure. Base station 105-f may be an example of aspects of a base station 105 described with reference to FIGS. 1-9. Base station 105-f may include a receiver 905-a, a BS enhanced PBCH module 910-a, or a transmitter 915-a. Base station 105-f may also include a processor. Each of these components may be in communication with one another. The BS enhanced PBCH module 910-a may also include a BS system configuration module 1005, a BS PBCH configuration module 1010, and a PBCH transmission module 1015.

The receiver 905-a may receive information which may be passed on to BS enhanced PBCH module 910-a, and to other components of base station 105-f. The BS enhanced PBCH module 910-a may perform the operations described above with reference to FIG. 9. The transmitter 915-a may transmit signals received from other components of base station 105-f.

The BS system configuration module 1005 may identify a system configuration of a cell as described above with reference to FIGS. 2-4. The BS PBCH configuration module 1010 may determine a PBCH configuration based at least in part on the system configuration as described above with reference to FIGS. 2-4. The PBCH transmission module 1015 may transmit a PBCH transmission to one or more UEs 115 according to the PBCH configuration as described above with reference to FIGS. 2-4. The PBCH transmission module 1015 may also transmit a second PBCH transmission based at least in part on a second PBCH configuration.

Figure 11:
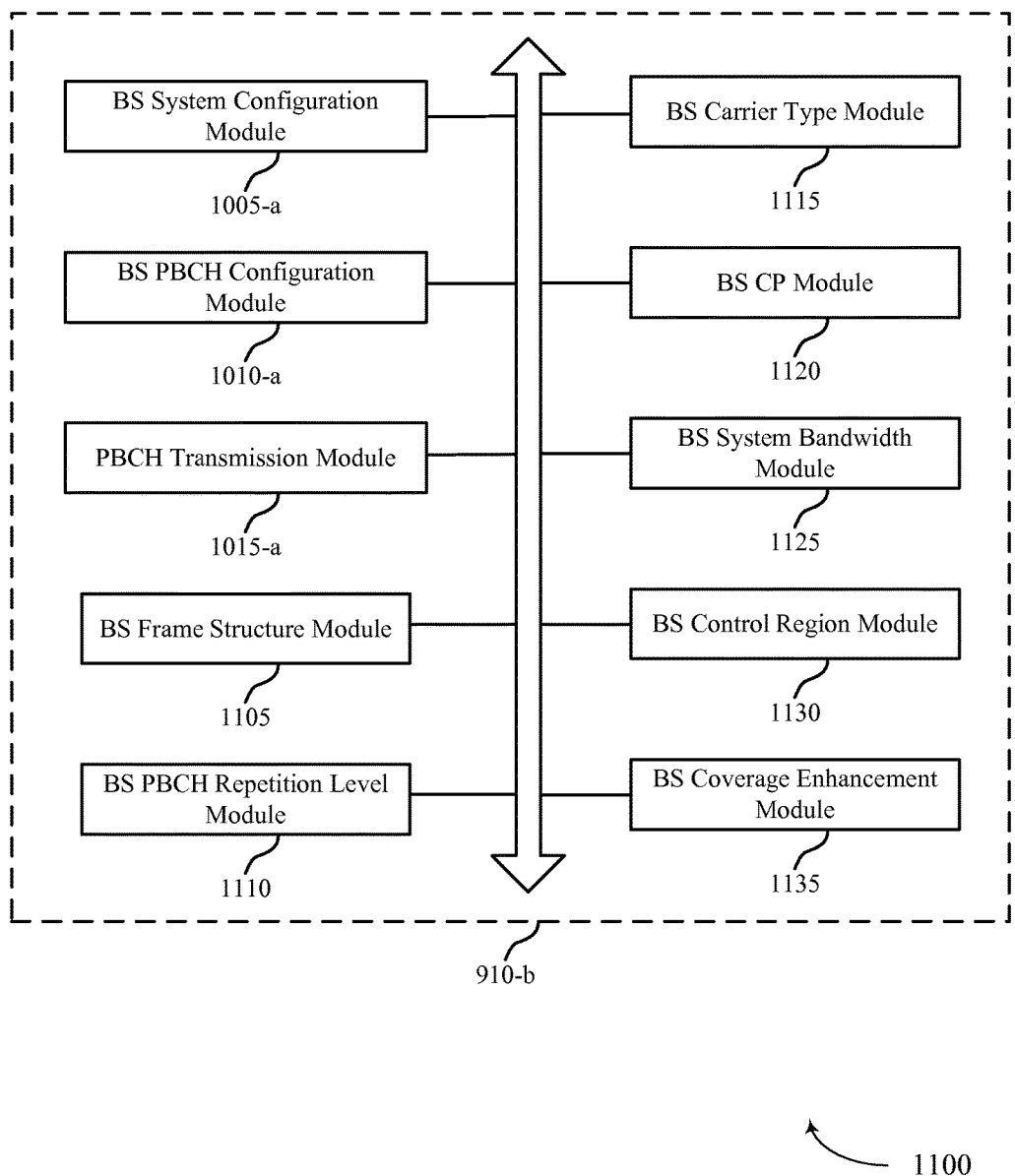
FIG. 11 shows a block diagram of a base station enhanced PBCH module that supports PBCH coverage enhancement in accordance with various aspects of the present disclosure.

FIG. 11 shows a block diagram 1100 of a BS enhanced PBCH module 910-b that supports PBCH coverage enhancement in accordance with various aspects of the present disclosure. The BS enhanced PBCH module 910-b may be an example of aspects of a BS enhanced PBCH module 910 described with reference to FIGS. 9-10. The BS enhanced PBCH module 910-b may include a BS system configuration module 1005-a, a BS PBCH configuration module 1010-a, and a PBCH transmission module 1015-a. Each of these modules may perform the functions described above with reference to FIG. 10. The BS enhanced PBCH module 910-b may also include a BS frame structure module 1105, a BS PBCH repetition level module 1110, a BS carrier type module 1115, a BS CP module 1120, a BS system bandwidth module 1125, a BS control region module 1130, a BS coverage enhancement module 1135.

The BS frame structure module 1105 may be configured to identify the system configuration, which may include identifying whether a TDD or an FDD scheme is being used by the system as described above with reference to FIGS. 2-4. In some examples, the BS PBCH repetition level module 1110 may determine a first or second PBCH repetition amount (e.g., for the FDD scheme and TDD scheme) as described above with reference to FIGS. 2-4.

The BS carrier type module 1115 may be configured to identify the system configuration, which may include identifying a carrier type for the system as described above with reference to FIGS. 2-4. In some cases, the BS CP module 1120 may be configured to identify the system configuration, which may include identifying a CP type for the system as described above with reference to FIGS. 2-4. The BS system bandwidth module 1125 may be configured such that identifying the system configuration may include identifying a system bandwidth as described above with reference to FIGS. 2-4. Additionally or alternatively, the BS control region module 1130 may determine a number of symbols for a control region corresponding to the system bandwidth, wherein the PBCH configuration is based at least in part on the number of symbols for the control region as described above with reference to FIGS. 2-4.

The BS coverage enhancement module 1135 may be configured to determine the PBCH configuration, which may include determining the PBCH configuration based at least in part on a coverage enhancement for one or more of the UEs as described above with reference to FIGS. 2-4. For example, in some cases one or more of the UEs may include an MTC device as described above and the coverage enhancement techniques may be used for MTC devices.

The components of base station 105-*e*, base station 105-*f*, or BS enhanced PBCH module 910-*b* may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 12:
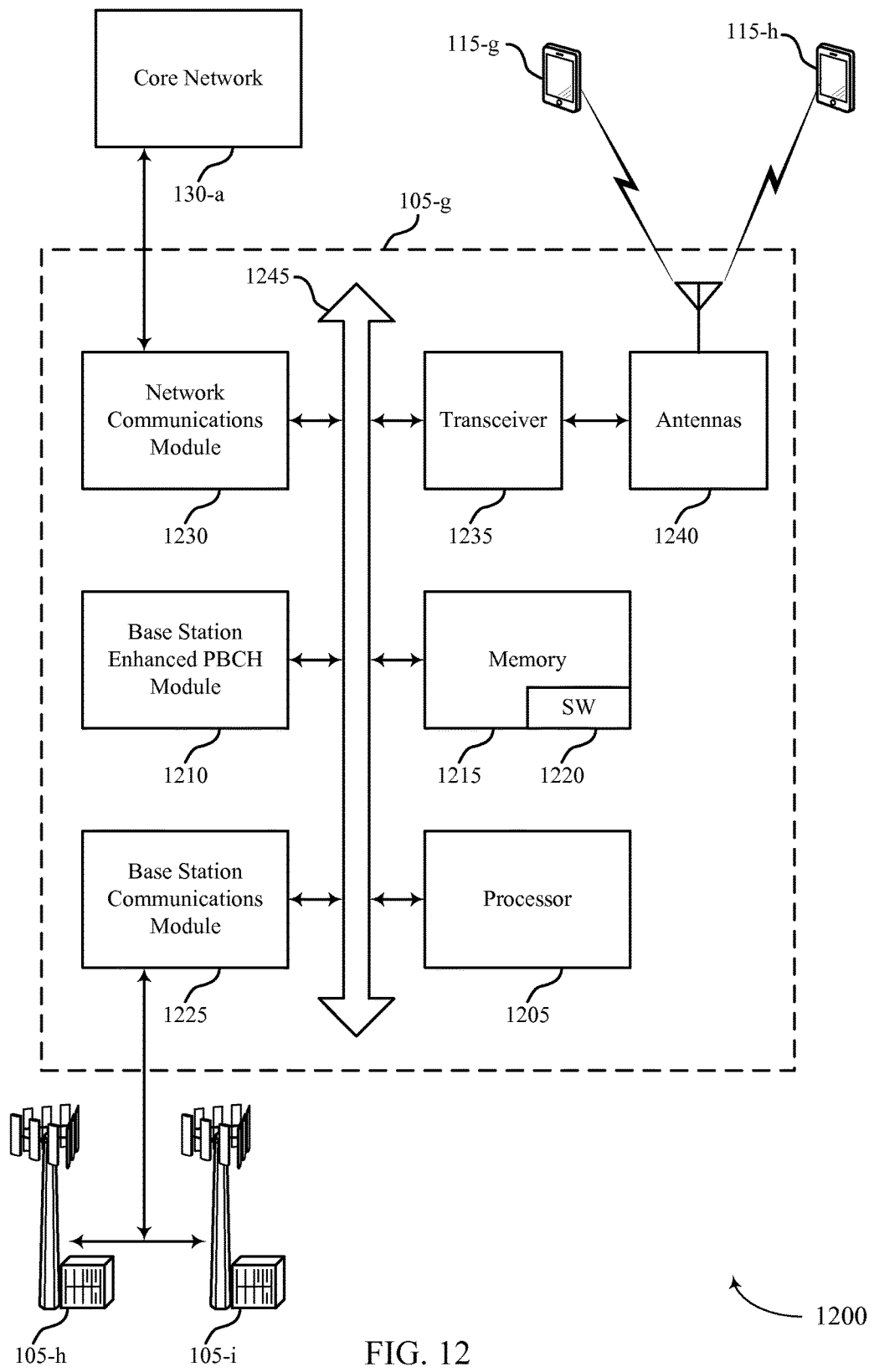
FIG. 12 illustrates a block diagram of a system, including a base station, that supports PBCH coverage enhancement in accordance with various aspects of the present disclosure.

FIG. 12 shows a diagram of a system 1200, including a base station 105, that supports PBCH coverage enhancement in accordance with various aspects of the present disclosure. System 1200 may include base station 105-*g*, which may be an example of a base station 105 described above with reference to FIGS. 1-11. Base station 105-*g* may include a BS enhanced PBCH module 1210, which may be an example of a BS enhanced PBCH module 910 described with reference to FIGS. 9-11. Base station 105-*g* may also include components for bi-directional voice and data communications including components for transmitting communications and components for receiving communications. For example, base station 105-*g* may communicate bi-directionally with UE 115-*g* or UE 115-*h*.

In some cases, base station 105-*g* may have one or more wired backhaul links Base station 105-*g* may have a wired backhaul link (e.g., S1 interface, etc.) to the core network 130. Base station 105-*g* may also communicate with other base stations 105, such as base station 105-*h* and base station 105-*i* via inter-base station backhaul links (e.g., an X2 interface). Each of the base stations 105 may communicate with UEs 115 using the same or different wireless communications technologies. In some cases, base station 105-*g* may communicate with other base stations such as 105-*h* or 105-*i* utilizing base station communications module 1225. In some examples, base station communications module 1225 may provide an X2 interface within an LTE/LTE-A wireless communication network technology to provide communication between some of the base stations 105. In some examples, base station 105-*g* may communicate with other base stations through core network 130. In some cases, base station 105-*g* may communicate with the core network 130 through network communications module 1230.

The base station 105-*g* may include a processor module 1205, memory 1215 (including software (SW) 1220), transceiver 1235, and antenna(s) 1240, which each may be in communication, directly or indirectly, with one another (e.g., over bus system 1245). The transceiver 1235 may be configured to communicate bi-directionally, via the antenna(s) 1240, with the UEs 115, which may be multi-mode devices. The transceiver 1235 (or other components of the base station 105-*g*) may also be configured to communicate bi-directionally, via the antennas 1240, with one or more other base stations (not shown). The transceiver 1235 may include a modem configured to modulate the packets and provide the modulated packets to the antennas 1240 for transmission, and to demodulate packets received from the antennas 1240. The base station 105-*g* may include multiple transceivers 1235, each with one or more associated antennas 1240. The transceiver module may be an example of a combined receiver 905 and transmitter 915 of FIG. 9.

The memory 1215 may include RAM and ROM. The memory 1215 may also store computer-readable, computer-executable software code 1220 containing instructions that are configured to, when executed, cause the processor module 1210 to perform various functions described herein (e.g., PBCH for coverage enhancement, selecting coverage enhancement techniques, call processing, database management, message routing, etc.). Alternatively, the software/firmware code 1220 may not be directly executable by the processor module 1205 but be configured to cause the computer, e.g., when compiled and executed, to perform functions described herein. The processor module 1205 may include an intelligent hardware device, e.g., a CPU, a microcontroller, an ASIC, etc. The processor module 1205 may include various special purpose processors such as encoders, queue processing modules, base band processors, radio head controllers, digital signal processor (DSPs), and the like.

The base station communications module 1225 may manage communications with other base stations 105. The communications management module may include a controller or scheduler for controlling communications with UEs 115 in cooperation with other base stations 105. For example, the base station communications module 1225 may coordinate scheduling for transmissions to UEs 115 for various interference mitigation techniques such as beamforming or joint transmission.

Figure 13:
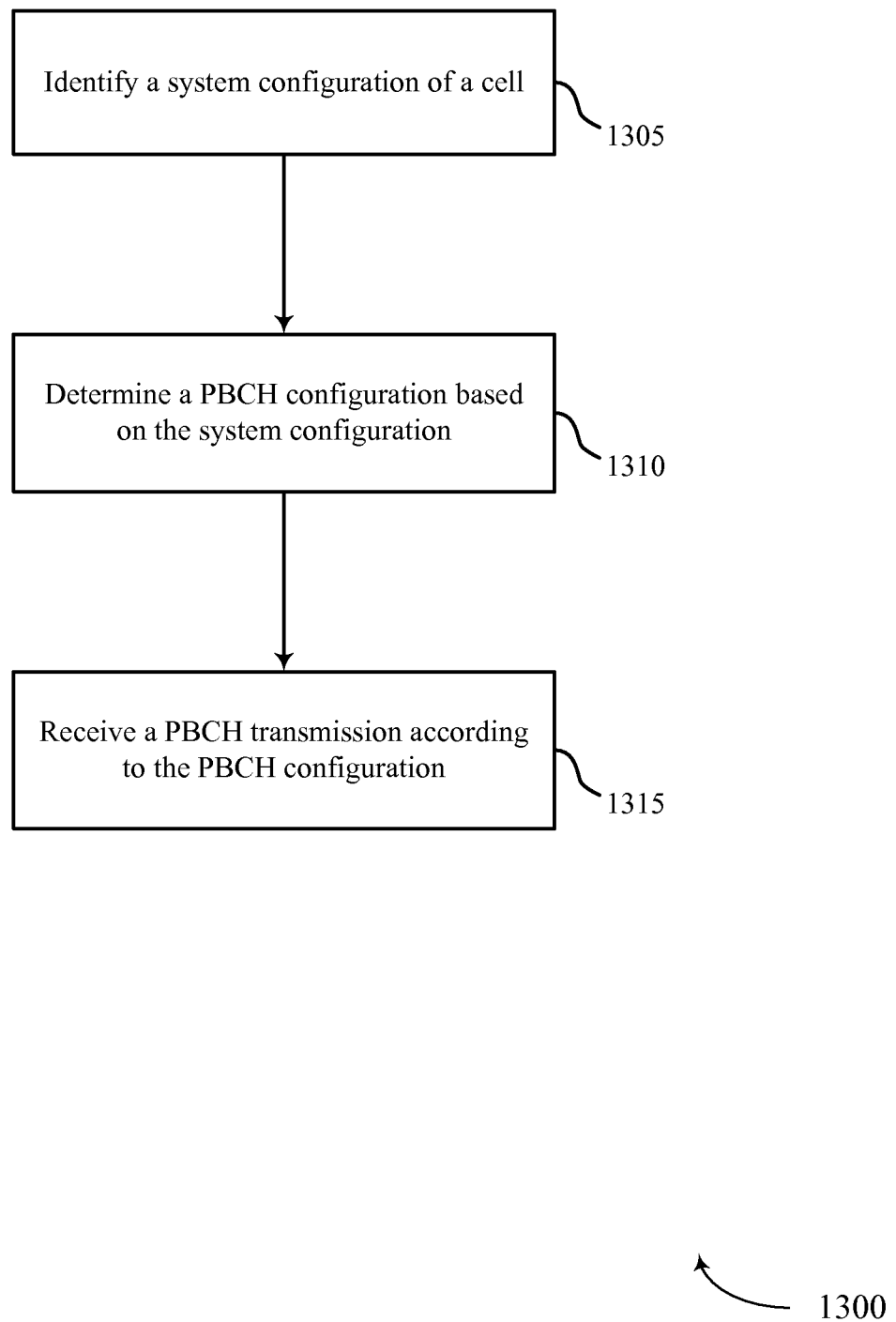
FIG. 13 shows a flowchart illustrating a method for PBCH coverage enhancement in accordance with various aspects of the present disclosure.

FIG. 13 shows a flowchart illustrating a method 1300 for PBCH coverage enhancement in accordance with various aspects of the present disclosure. The operations of method 1300 may be implemented by a UE 115 or its components as described with reference to FIGS. 1-12. For example, the operations of method 1300 may be performed by the enhanced PBCH module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may identify a system configuration of a cell as described above with reference to FIGS. 2-4. In certain examples, the operations of block 1305 may be performed by the system configuration module 605 as described above with reference to FIG. 6.

At block 1310, the UE 115 may determine a PBCH configuration based at least in part on the system configuration as described above with reference to FIGS. 2-4. In certain examples, the operations of block 1310 may be performed by the PBCH configuration module 610 as described above with reference to FIG. 6.

At block 1315, the UE 115 may receive a PBCH transmission according to the PBCH configuration as described above with reference to FIGS. 2-4. In certain examples, the operations of block 1315 may be performed by the PBCH reception module 615 as described above with reference to FIG. 6.

Figure 14:
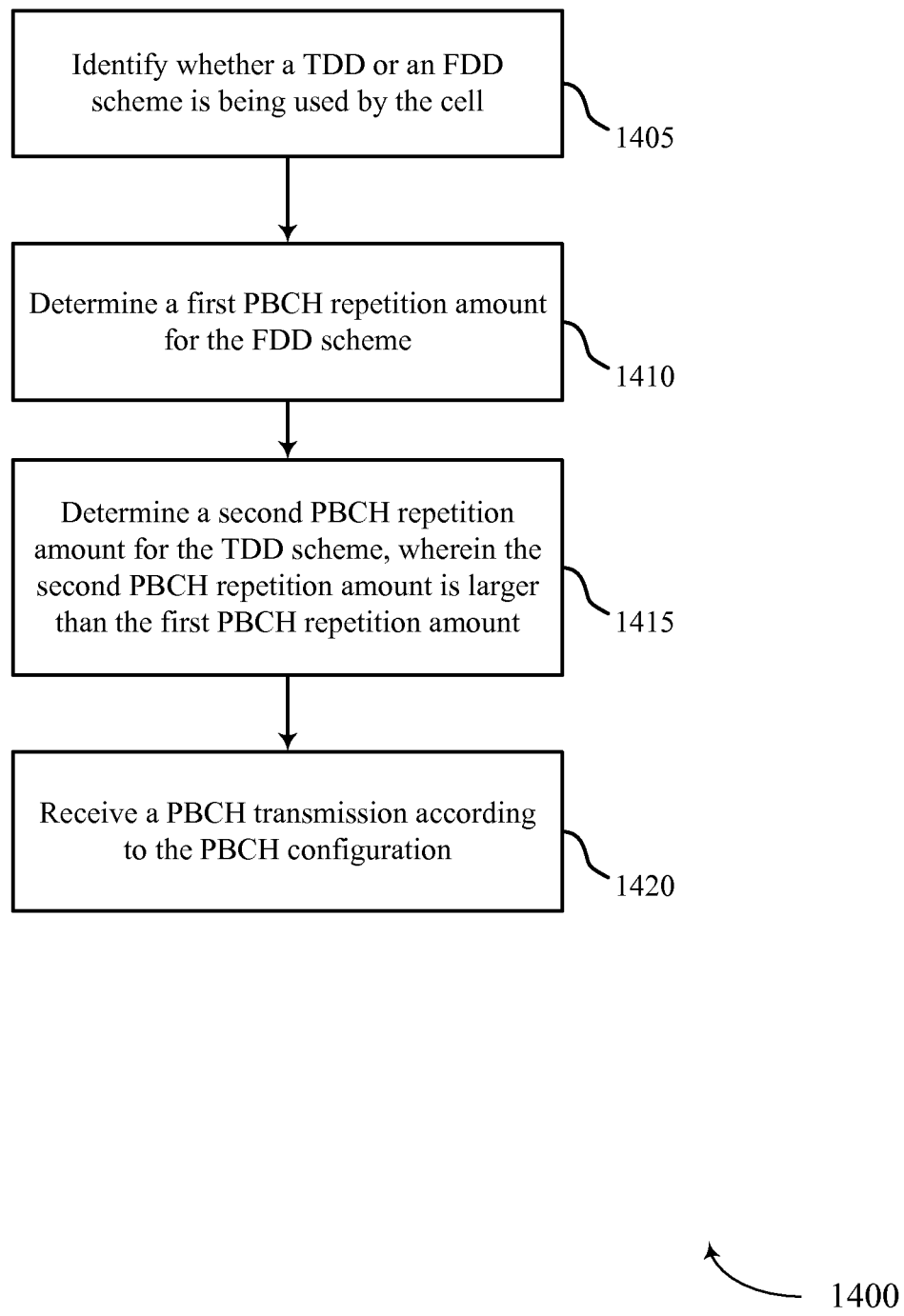
FIG. 14 shows a flowchart illustrating a method for PBCH coverage enhancement in accordance with various aspects of the present disclosure.

FIG. 14 shows a flowchart illustrating a method 1400 for PBCH coverage enhancement in accordance with various aspects of the present disclosure. The operations of method 1400 may be implemented by a UE 115 or its components as described with reference to FIGS. 1-12. For example, the operations of method 1400 may be performed by the enhanced PBCH module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1405, the UE 115 may identify a system configuration of a cell as described above with reference to FIGS. 2-4. In some cases, identifying the system configuration comprises identifying whether a TDD or an FDD scheme is being used by the system. In certain examples, the operations of block 1405 may be performed by the system configuration module 605 as described above with reference to FIG. 6.

At block 1410, the UE 115 may determine a PBCH configuration based at least in part on the system configuration as described above with reference to FIGS. 2-4. In some cases, the PBCH configuration is determined based at least in part on whether the TDD or the FDD scheme is being used by the system. In certain examples, the operations of block 1410 may be performed by the PBCH configuration module 610 as described above with reference to FIG. 6. In some cases, the PBCH configuration may comprise a PBCH repetition amount, and the UE 115 may determine a first PBCH repetition amount for an FDD scheme as described above with reference to FIGS. 2-4. In certain examples, the operations of block 1420 may be performed by the PBCH repetition level module 710 as described above with reference to FIG. 7.

At block 1415, the UE 115 may determine a second PBCH repetition amount for a TDD scheme, wherein the second PBCH repetition amount is larger than the first PBCH repetition amount as described above with reference to FIGS. 2-4. In certain examples, the operations of block 1415 may be performed by the PBCH repetition level module 710 as described above with reference to FIG. 7.

At block 1420, the UE 115 may receive a PBCH transmission according to the PBCH configuration as described above with reference to FIGS. 2-4. In certain examples, the operations of block 1420 may be performed by the PBCH reception module 615 as described above with reference to FIG. 6.

Figure 15:
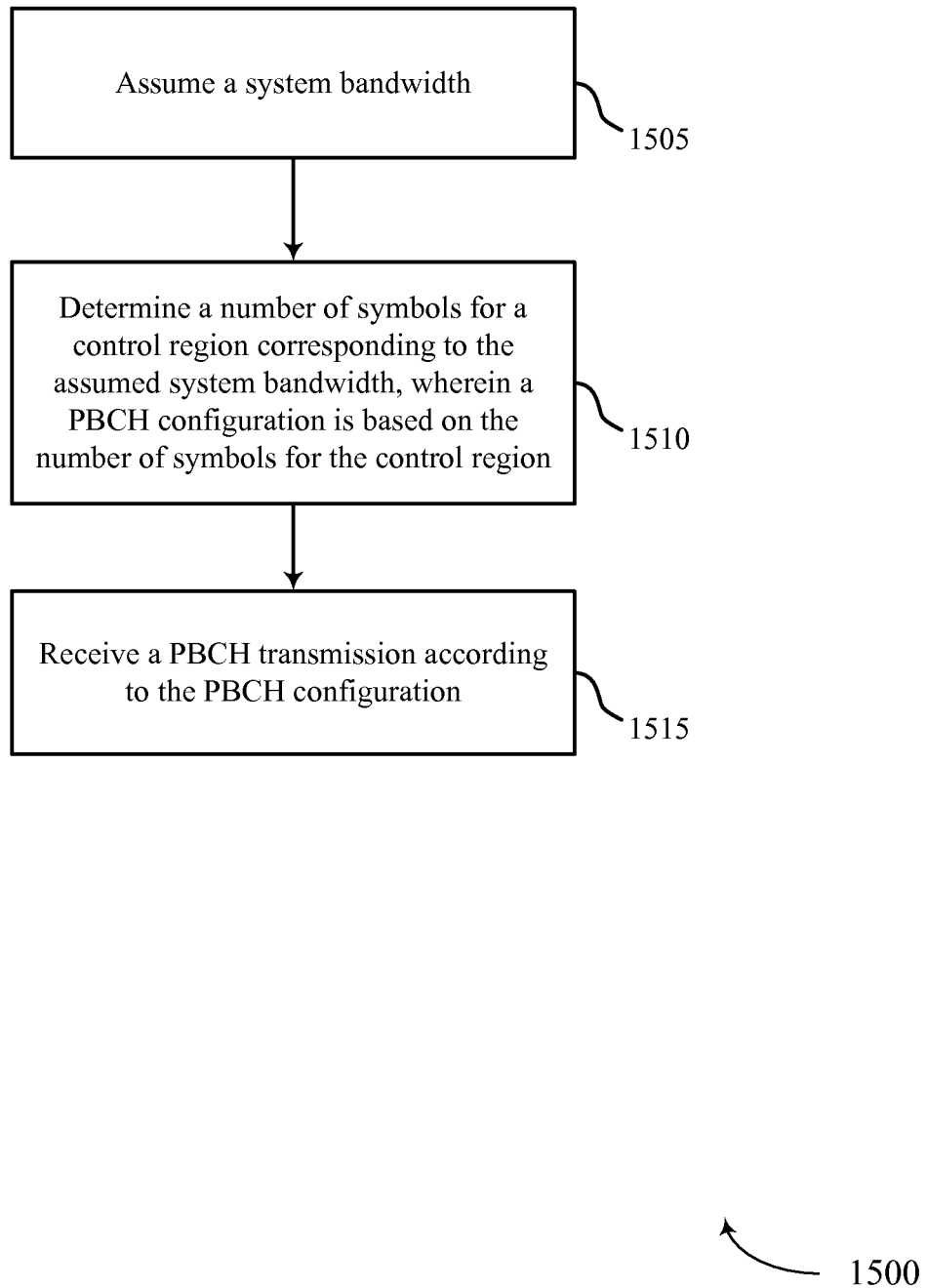
FIG. 15 shows a flowchart illustrating a method for PBCH coverage enhancement in accordance with various aspects of the present disclosure.

FIG. 15 shows a flowchart illustrating a method 1500 for PBCH coverage enhancement in accordance with various aspects of the present disclosure. The operations of method 1500 may be implemented by a UE 115 or its components as described with reference to FIGS. 1-12. For example, the operations of method 1500 may be performed by the enhanced PBCH module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1300 or 1400 of FIG. 13 or 14.

At block 1505, the UE 115 may identify a system configuration of a cell as described above with reference to FIGS. 2-4. For example, identifying the system configuration comprises: assuming a system bandwidth. In certain examples, the operations of block 1505 may be performed by the system configuration module 605 as described above with reference to FIG. 6.

At block 1510, the UE 115 may determine a PBCH configuration based at least in part on the system configuration as described above with reference to FIGS. 2-4. In some cases, the PBCH configuration is determined based at least in part on the assumed system bandwidth. In certain examples, the operations of block 1510 may be performed by the PBCH configuration module 610 as described above with reference to FIG. 6. In some cases, the UE 115 may determine a number of symbols for a control region corresponding to the assumed system bandwidth, wherein the PBCH configuration is based at least in part on the number of symbols for the control region as described above with reference to FIGS. 2-4. The operations of block 1510 may be performed by the control region module 730 as described above with reference to FIG. 7.

At block 1515, the UE 115 may receive a PBCH transmission according to the PBCH configuration as described above with reference to FIGS. 2-4. In certain examples, the operations of block 1515 may be performed by the PBCH reception module 615 as described above with reference to FIG. 6.

Figure 16:
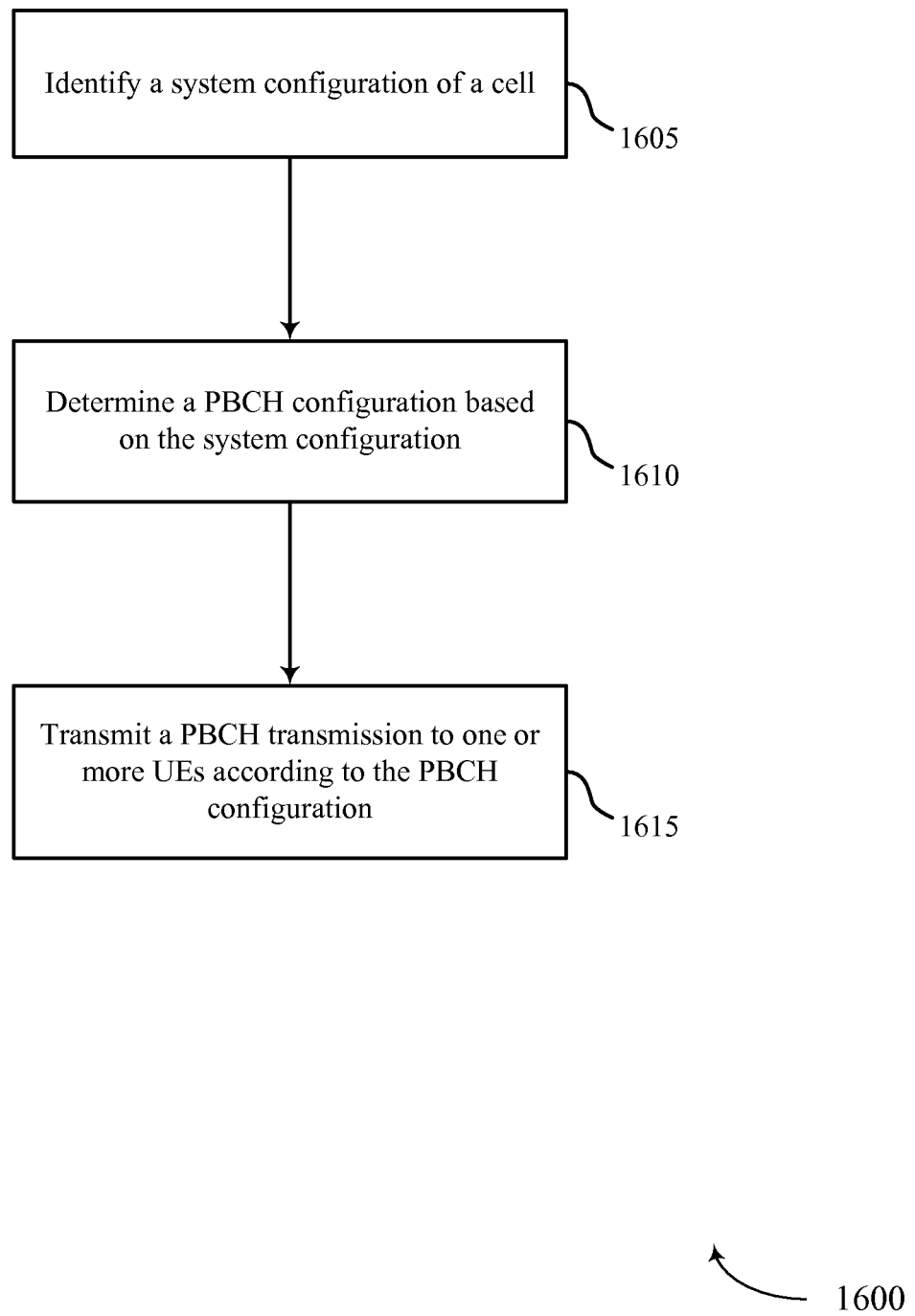
FIG. 16 shows a flowchart illustrating a method for PBCH coverage enhancement in accordance with various aspects of the present disclosure.

FIG. 16 shows a flowchart illustrating a method 1600 for PBCH coverage enhancement in accordance with various aspects of the present disclosure. The operations of method 1600 may be implemented by a base station 105 or its components as described with reference to FIGS. 1-12. For example, the operations of method 1600 may be performed by the BS enhanced PBCH module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware.

At block 1605, the base station 105 may identify a system configuration of a cell as described above with reference to FIGS. 2-4. In certain examples, the operations of block 1605 may be performed by the system configuration module 605 as described above with reference to FIG. 6.

At block 1610, the base station 105 may determine a PBCH configuration based at least in part on the system configuration as described above with reference to FIGS.

2-4. In certain examples, the operations of block 1610 may be performed by the PBCH configuration module 610 as described above with reference to FIG. 6.

At block 1615, the base station 105 may transmit a PBCH transmission to one or more UEs according to the PBCH configuration as described above with reference to FIGS. 2-4. In certain examples, the operations of block 1615 may be performed by the PBCH transmission module 1015 as described above with reference to FIG. 10.

Figure 17:
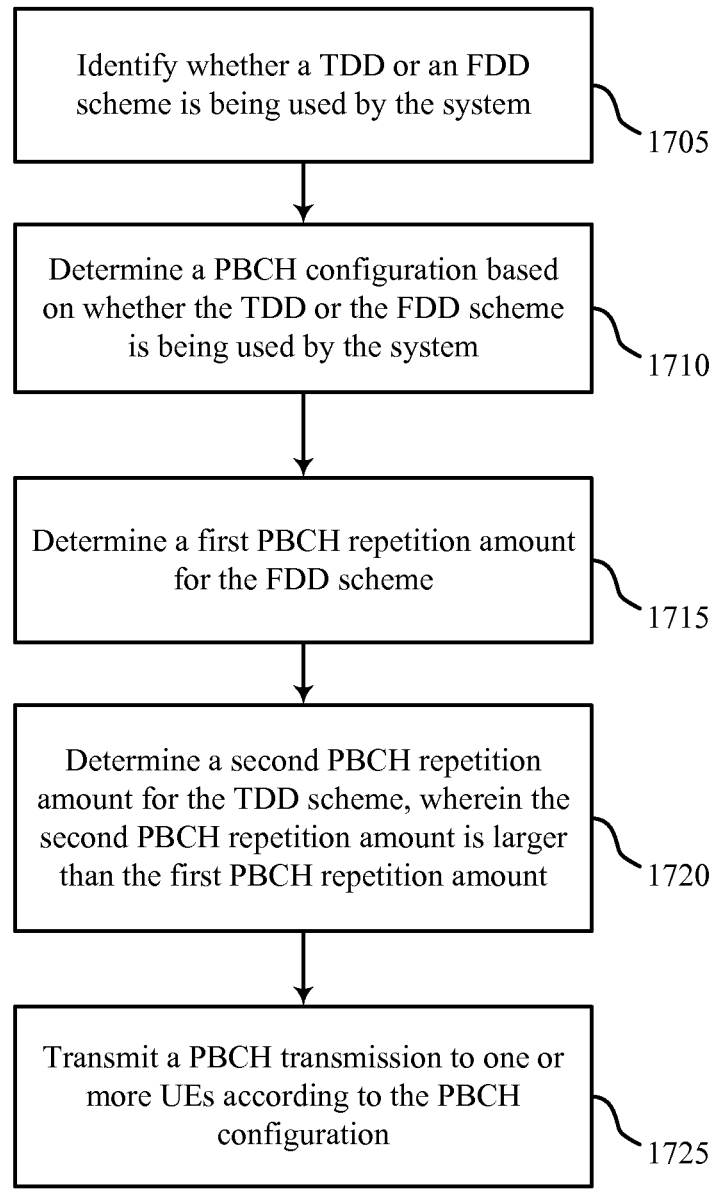
FIG. 17 shows a flowchart illustrating a method for PBCH coverage enhancement in accordance with various aspects of the present disclosure.

FIG. 17 shows a flowchart illustrating a method 1700 for PBCH coverage enhancement in accordance with various aspects of the present disclosure. The operations of method 1700 may be implemented by a base station 105 or its components as described with reference to FIGS. 1-12. For example, the operations of method 1700 may be performed by the BS enhanced PBCH module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1700 may also incorporate aspects of methods 1600 of FIG. 16.

At block 1705, the base station 105 may identify a system configuration of a cell as described above with reference to FIGS. 2-4. In some cases, identifying the system configuration comprises: identifying whether a TDD or an FDD scheme is being used by the system. In certain examples, the operations of block 1705 may be performed by the system configuration module 605 as described above with reference to FIG. 6.

At block 1710, the base station 105 may determine a PBCH configuration based at least in part on the system configuration as described above with reference to FIGS. 2-4. In some cases, the PBCH configuration is determined based at least in part on whether the TDD or the FDD scheme is being used by the system. In certain examples, the operations of block 1710 may be performed by the PBCH configuration module 610 as described above with reference to FIG. 6.

At block 1715, the base station 105 may determine a first PBCH repetition amount for the FDD scheme as described above with reference to FIGS. 2-4. In certain examples, the operations of block 1715 may be performed by the PBCH repetition level module 710 as described above with reference to FIG. 7.

At block 1720, the base station 105 may determine a second PBCH repetition amount for the TDD scheme, wherein the second PBCH repetition amount is larger than the first PBCH repetition amount as described above with reference to FIGS. 2-4. In certain examples, the operations of block 1720 may be performed by the PBCH repetition level module 710 as described above with reference to FIG. 7.

At block 1725, the base station 105 may transmit a PBCH transmission to one or more UEs according to the PBCH configuration as described above with reference to FIGS. 2-4. In certain examples, the operations of block 1725 may be performed by the PBCH transmission module 1015 as described above with reference to FIG. 10.

Figure 18:
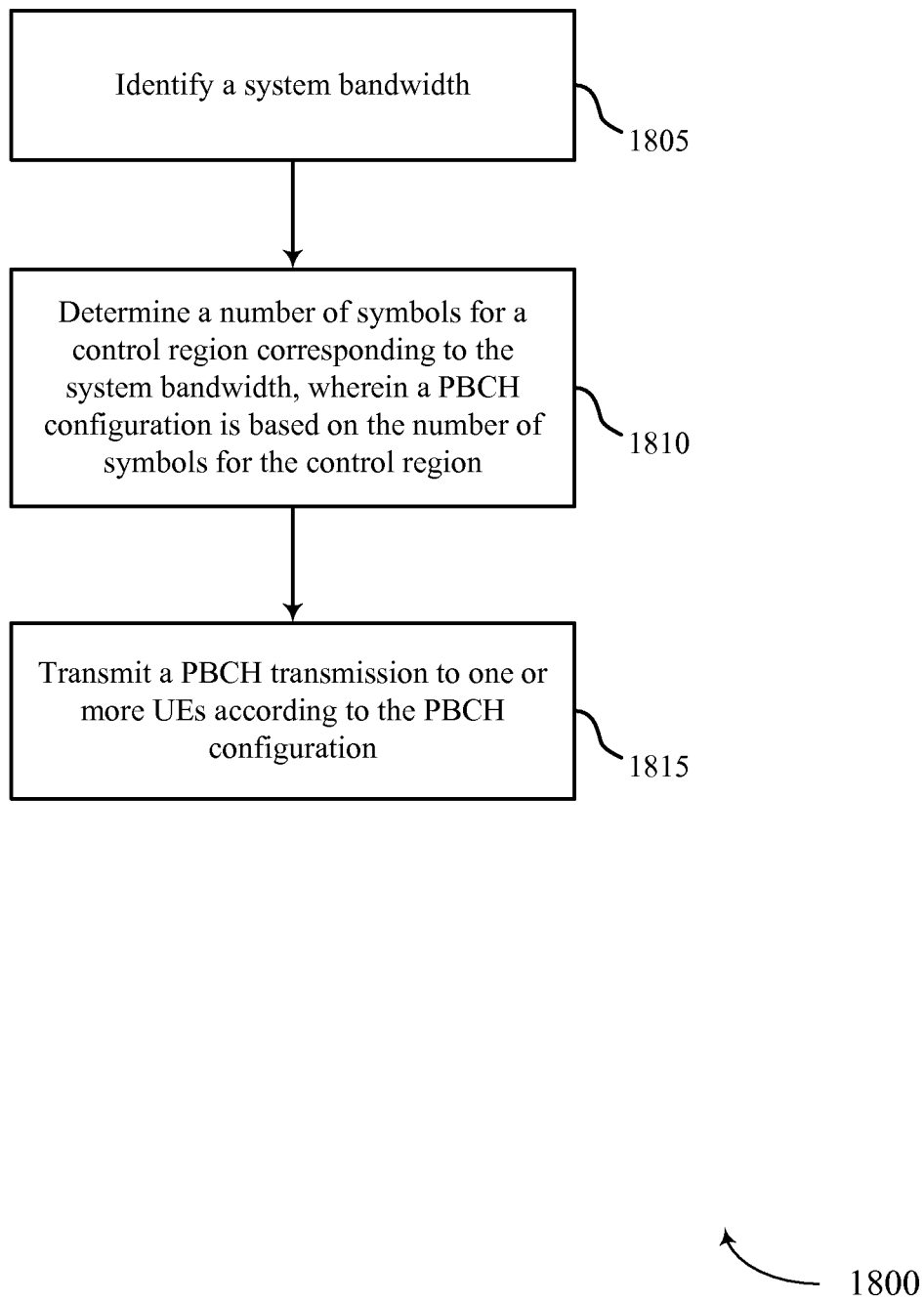
FIG. 18 shows a flowchart illustrating a method for PBCH coverage enhancement in accordance with various aspects of the present disclosure.

FIG. 18 shows a flowchart illustrating a method 1800 for PBCH coverage enhancement in accordance with various aspects of the present disclosure. The operations of method 1800 may be implemented by a base station 105 or its components as described with reference to FIGS. 1-12. For example, the operations of method 1800 may be performed by the BS enhanced PBCH module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1800 may also incorporate aspects of methods 1600 or 1700 of FIG. 16 or 17.

At block 1805, the base station 105 may identify a system configuration of a cell as described above with reference to FIGS. 2-4. In some cases, identifying the system configuration comprises: identifying a system bandwidth. In certain examples, the operations of block 1805 may be performed by the system configuration module 605 as described above with reference to FIG. 6.

At block 1810, the base station 105 may determine a PBCH configuration based at least in part on the system configuration as described above with reference to FIGS. 2-4. In some cases, the PBCH configuration is determined based at least in part on the system bandwidth. In certain examples, the operations of block 1810 may be performed by the PBCH configuration module 610 as described above with reference to FIG. 6 For example, the base station 105 may determine a number of symbols for a control region corresponding to the system bandwidth, wherein the PBCH configuration is based at least in part on the number of symbols for the control region as described above with reference to FIGS. 2-4. In certain examples, the operations of block 1810 may be performed by the BS control region module 1130 as described above with reference to FIG. 11.

At block 1815, the base station 105 may transmit a PBCH transmission to one or more UEs according to the PBCH configuration as described above with reference to FIGS. 2-4. In certain examples, the operations of block 1815 may be performed by the PBCH transmission module 1015 as described above with reference to FIG. 11.

Thus, methods 1300, 1400, 1500, 1600, 1700, and 1800 may provide for PBCH coverage enhancement. It should be noted that methods 1300, 1400, 1500, 1600, 1700, and 1800 describe possible implementation, and that the operations and the steps may be rearranged or otherwise modified such that other implementations are possible. In some examples, aspects from two or more of the methods 1300, 1400, 1500, 1600, 1700, and 1800 may be combined.

The detailed description set forth above in connection with the appended drawings describes example embodiments and does not represent all the embodiments that may be implemented or that are within the scope of the claims. The term "exemplary," as may be used in this description, means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
 identifying a system configuration of a cell based on at least one of identifying a carrier type for a system or assuming a system bandwidth;
 determining a physical broadcast channel (PBCH) configuration based at least in part on the system configuration; and
 receiving a PBCH transmission according to the PBCH configuration.

2. The method of claim 1, wherein determining the PBCH configuration comprises:
 determining an amount of PBCH repetition based at least in part on the identified system configuration.

3. The method of claim 1, wherein identifying the system configuration further comprises:
 identifying whether a time division duplexing (TDD) or a frequency division duplexing (FDD) scheme is being used by the system; and
 wherein the PBCH configuration is determined based at least in part on whether the TDD or the FDD scheme is being used by the system, and at least one of the carrier type or the system bandwidth.

4. The method of claim 3, further comprising:
determining a first PBCH repetition amount for the FDD scheme; and
determining a second PBCH repetition amount for the TDD scheme, wherein the second PBCH repetition amount is larger than the first PBCH repetition amount.

5. The method of claim 1, wherein identifying the system configuration further comprises:
identifying a cyclic prefix (CP) type for the system; and
wherein the PBCH configuration is determined based at least in part on the CP type, and at least one of the carrier type or the system bandwidth.

6. The method of claim 1, wherein receiving the PBCH transmission comprises:
performing PBCH detection based on an assumed size of a control region, irrespective of the system bandwidth.

7. The method of claim 6, wherein the assumed size of the control region is three (3) symbols.

8. The method of claim 1, further comprising:
identifying a second system configuration of a second cell;
determining a second PBCH configuration based on the second system configuration, wherein the second PBCH configuration is different from the PBCH configuration; and
receiving a second PBCH transmission based on the second PBCH configuration.

9. The method of claim 1, wherein determining the PBCH configuration comprises:
determining the PBCH configuration based at least in part on a coverage enhancement for the UE.

10. A method of wireless communication at a base station, comprising:
identifying a system configuration of a cell based on at least one of identifying a carrier type for a system or assuming a system bandwidth;
determining a physical broadcast channel (PBCH) configuration based at least in part on the system configuration; and
transmitting a PBCH transmission to one or more user equipment (UEs) according to the PBCH configuration.

11. The method of claim 10, wherein determining the PBCH configuration comprises:
determining an amount of PBCH repetition based at least in part on the identified system configuration.

12. The method of claim 10, wherein identifying the system configuration comprises:
identifying whether a time division duplexing (TDD) or a frequency division duplexing (FDD) scheme is being used by the system; and
wherein the PBCH configuration is determined based at least in part on whether the TDD or the FDD scheme is being used by the system, and at least one of the carrier type or the system bandwidth.

13. The method of claim 12, further comprising:
determining a first PBCH repetition amount for the FDD scheme; and
determining a second PBCH repetition amount for the TDD scheme, wherein the second PBCH repetition amount is larger than the first PBCH repetition amount.

14. The method of claim 10, further comprising:
identifying a second system configuration of a second cell;
determining a second PBCH configuration based on the second system configuration, wherein the second PBCH configuration is different from the PBCH configuration; and
transmitting a second PBCH transmission based at least in part on the second PBCH configuration.

15. The method of claim 10, wherein determining the PBCH configuration comprises:
determining the PBCH configuration based at least in part on a coverage enhancement for one or more of the UEs.

16. An apparatus for wireless communication at a user equipment (UE), comprising:
a processor;
memory in electronic communication with the processor; and
instructions stored in the memory; wherein the instructions are executable by the processor to cause the apparatus to:
identify a system configuration of a cell based on at least one of identifying a carrier type for a system or assuming a system bandwidth;
determine a physical broadcast channel (PBCH) configuration based at least in part on the system configuration; and
receive a PBCH transmission according to the PBCH configuration.

17. The apparatus of claim 16, wherein the instructions are executable by the processor to cause the apparatus to:
determine an amount of PBCH repetition based at least in part on the identified system configuration.

18. The apparatus of claim 16, wherein the instructions are executable by the processor to cause the apparatus to:
identify whether a time division duplexing (TDD) or a frequency division duplexing (FDD) scheme is being used by the system; and
determine the PBCH configuration based at least in part on whether the TDD or the FDD scheme is being used by the system, and at least one of the carrier type or the system bandwidth.

19. The apparatus of claim 18, wherein the instructions are executable by the processor to cause the apparatus to:
determine a first PBCH repetition amount for the FDD scheme; and
determine a second PBCH repetition amount for the TDD scheme, wherein the second PBCH repetition amount is larger than the first PBCH repetition amount.

20. The apparatus of claim 16, wherein the instructions are further executable by the processor to cause the apparatus to:
identify a cyclic prefix (CP) type for the system; and
determine the PBCH configuration based at least in part on the CP type, and at least one of the carrier type or the system bandwidth.

21. The apparatus of claim 16, wherein the instructions are executable by the processor to cause the apparatus to:
perform PBCH detection based on an assumed size of a control region, irrespective of the system bandwidth.

22. The apparatus of claim 21, wherein the instructions are executable by the processor to cause the apparatus to:
assume the size of the control region is three (3) symbols.

23. The apparatus of claim 16, wherein the instructions are executable by the processor to cause the apparatus to:
identify a second system configuration of a second cell;
determine a second PBCH configuration based on the second system configuration, wherein the second PBCH configuration is different from the PBCH configuration; and
receive a second PBCH transmission based on the second PBCH configuration.

24. The apparatus of claim 16, wherein the instructions are executable by the processor to cause the apparatus to:

determine the PBCH configuration based at least in part on a coverage enhancement for the UE.

25. An apparatus for wireless communication at a base station, comprising:
a processor;
memory in electronic communication with the processor; and
instructions stored in the memory; wherein the instructions are executable by the processor to cause the apparatus to:
identify a system configuration of a cell based on at least one of identifying a carrier type for a system or assuming a system bandwidth;
determine a physical broadcast channel (PBCH) configuration based at least in part on the system configuration; and
transmit a PBCH transmission to one or more user equipment (UEs) according to the PBCH configuration.

26. The apparatus of claim 25, wherein the instructions are executable by the processor to cause the apparatus to:
determine an amount of PBCH repetition based at least in part on the identified system configuration.

27. The apparatus of claim 25, wherein the instructions are executable by the processor to cause the apparatus to:
identify whether a time division duplexing (TDD) or a frequency division duplexing (FDD) scheme is being used by the system; and
determine the PBCH configuration based at least in part on whether the TDD or the FDD scheme is being used by the system, and at least one of the carrier type or the system bandwidth.

28. The apparatus of claim 27, wherein the instructions are executable by the processor to cause the apparatus to:
determine a first PBCH repetition amount for the FDD scheme; and
determine a second PBCH repetition amount for the TDD scheme, wherein the second PBCH repetition amount is larger than the first PBCH repetition amount.

29. The apparatus of claim 25, wherein the instructions are executable by the processor to cause the apparatus to:
identify a second system configuration of a second cell;
determine a second PBCH configuration based on the second system configuration, wherein the second PBCH configuration is different from the PBCH configuration; and
transmit a second PBCH transmission based at least in part on the second PBCH configuration.

30. The apparatus of claim 25, wherein determining the PBCH configuration comprises:
determining the PBCH configuration based at least in part on a coverage enhancement for one or more of the UEs.

* * * * *